(12) United States Patent
Dropps et al.

(10) Patent No.: US 7,630,384 B2
(45) Date of Patent: Dec. 8, 2009

(54) METHOD AND SYSTEM FOR DISTRIBUTING CREDIT IN FIBRE CHANNEL SYSTEMS

(75) Inventors: Frank R Dropps, Maple Grove, MN (US); Ernest G Kohlwey, Eagan, MN (US); Edward C. Ross, Edina, MN (US); Mark A. Owen, Apple Valley, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 566 days.

(21) Appl. No.: 10/894,586

(22) Filed: Jul. 20, 2004

(65) Prior Publication Data

US 2005/0018674 A1   Jan. 27, 2005

Related U.S. Application Data

(60) Provisional application No. 60/503,812, filed on Sep. 19, 2003, provisional application No. 60/537,933, filed on Jan. 21, 2004, provisional application No. 60/488,757, filed on Jul. 21, 2003, provisional application No. 60/532,965, filed on Dec. 29, 2003, provisional application No. 60/504,038, filed on Sep. 19, 2003, provisional application No. 60/495,212, filed on Aug. 14, 2003, provisional application No. 60/495,165, filed on Aug. 14, 2003, provisional application No. 60/503,809, filed on Sep. 19, 2003, provisional application No. 60/505,381, filed on Sep. 23, 2003, provisional application No. 60/505,195, filed on Sep. 23, 2003, provisional application No. 60/557,613, filed on Mar. 30, 2004, provisional application No. 60/505,075, filed on Sep. 23, 2003, provisional application No. 60/504,950, filed on Sep. 19, 2003, provisional application No. 60/532,967, filed on Dec. 29, 2003, provisional application No. 60/532,966, filed on Dec. 29, 2003, provisional application No. 60/550,250, filed on Mar. 4, 2004, provisional application No. 60/569,436, filed on May 7, 2004, provisional application No. 60/572,197, filed on May 18, 2004, provisional application No. 60/532,963, filed on Dec. 29, 2003.

(51) Int. Cl.
*H04L 12/56* (2006.01)

(52) U.S. Cl. .................... 370/397; 370/230

(58) Field of Classification Search .......... 370/389, 370/397, 400, 230, 236, 241, 412; 709/212, 709/241
See application file for complete search history.

(56) References Cited

U.S. PATENT DOCUMENTS 4,081,612 A    3/1978 Hafner (Continued)

FOREIGN PATENT DOCUMENTS

EP         0649098        9/1994

(Continued)

OTHER PUBLICATIONS

Malavalli et al. "Fibre Channel Framing and Signaling (FC-FS) REV 1.10", NCITS working draft proposed American National Standard for Information Tecchnology, Jan. 25, 2001.*

(Continued)

*Primary Examiner*—Kwang B Yao
*Assistant Examiner*—Andrew Lai
(74) *Attorney, Agent, or Firm*—Klein, O'Neill & Singh, LLP

(57) ABSTRACT

A method and system for distributing credit using a fiber channel switch element is provided. The switch element includes, a wait threshold counter that is used to set up a status for a port that has to wait for certain duration to send a frame due to lack of buffer to buffer credit; a credit module that controls buffer to buffer credit for a transmit segment of the fiber channel switch element; and a virtual lane credit module with a counter that is incremented every time a frame assigned to a virtual lane is sent and decreased every time a VC_RDY is received. The method includes, determining if a VC_RDY primitive is received; and allocating credit to a virtual lane that is not at its maximum credit, after the VC_RDY primitive is received.

12 Claims, 14 Drawing Sheets

U.S. PATENT DOCUMENTS

| | | | |
|---|---|---|---|
| 4,162,375 A | 7/1979 | Schlichte | 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,691,296 A | 9/1987 | Struger | |
| 4,716,561 A | 12/1987 | Angell et al. | |
| 4,725,835 A | 2/1988 | Schreiner et al. | 340/825.83 |
| 4,821,034 A | 4/1989 | Anderson et al. | 340/825 |
| 4,860,193 A | 8/1989 | Bentley et al. | |
| 4,964,119 A | 10/1990 | Endo et al. | |
| 4,980,857 A | 12/1990 | Walter et al. | |
| 5,025,370 A | 6/1991 | Koegel et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,258,751 A | 11/1993 | DeLuca et al. | |
| 5,260,933 A * | 11/1993 | Rouse | 370/216 |
| 5,260,935 A | 11/1993 | Turner | |
| 5,280,483 A | 1/1994 | Kamoi et al. | |
| 5,291,481 A | 3/1994 | Doshi et al. | |
| 5,339,311 A | 8/1994 | Turner | |
| 5,367,520 A | 11/1994 | Cordell | 370/60 |
| 5,390,173 A | 2/1995 | Spinney et al. | |
| 5,425,022 A | 6/1995 | Clark et al. | |
| 5,537,400 A | 7/1996 | Diaz et al. | |
| 5,568,165 A | 10/1996 | Kimura | |
| 5,568,167 A | 10/1996 | Galbi et al. | |
| 5,568,614 A | 10/1996 | Mendelson et al. | |
| 5,579,443 A | 11/1996 | Tatematsu et al. | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,638,518 A | 6/1997 | Malladi | |
| 5,666,483 A | 9/1997 | McClary | |
| 5,677,909 A | 10/1997 | Heide | |
| 5,687,172 A | 11/1997 | Cloonan et al. | 370/395 |
| 5,701,416 A | 12/1997 | Thorson et al. | |
| 5,706,279 A | 1/1998 | Teraslinna | |
| 5,732,206 A | 3/1998 | Mendel | |
| 5,748,612 A | 5/1998 | Stoevhase et al. | 370/230 |
| 5,757,771 A | 5/1998 | Li et al. | |
| 5,764,927 A | 6/1998 | Murphy et al. | |
| 5,768,271 A | 6/1998 | Seid et al. | |
| 5,768,533 A | 6/1998 | Ran | |
| 5,784,358 A | 7/1998 | Smith et al. | |
| 5,790,545 A | 8/1998 | Holt et al. | |
| 5,790,840 A | 8/1998 | Bulka et al. | |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,822,300 A | 10/1998 | Johnson et al. | |
| 5,825,748 A * | 10/1998 | Barkey et al. | 370/236 |
| 5,828,475 A | 10/1998 | Bennett et al. | |
| 5,835,748 A * | 11/1998 | Orenstein et al. | 712/217 |
| 5,835,752 A | 11/1998 | Chiang et al. | |
| 5,850,386 A * | 12/1998 | Anderson et al. | 370/241 |
| 5,892,604 A | 4/1999 | Yamanaka et al. | |
| 5,894,560 A | 4/1999 | Carmichael et al. | |
| 5,925,119 A | 7/1999 | Maroney | |
| 5,936,442 A | 8/1999 | Liu et al. | |
| 5,937,169 A | 8/1999 | Connery et al. | |
| 5,954,796 A | 9/1999 | McCarty et al. | |
| 5,974,547 A | 10/1999 | Klimenko | |
| 5,978,359 A | 11/1999 | Caldara et al. | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,009,226 A | 12/1999 | Tsuji et al. | |
| 6,011,779 A | 1/2000 | Wills | |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,046,979 A | 4/2000 | Bauman | |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,118,791 A | 9/2000 | Fichou et al. | |
| 6,128,292 A | 10/2000 | Kim et al. | 370/356 |
| 6,131,123 A | 10/2000 | Hurst et al. | |
| 6,134,127 A | 10/2000 | Kirchberg | |
| 6,144,668 A | 11/2000 | Bass et al. | |
| 6,147,976 A | 11/2000 | Shand et al. | |
| 6,148,421 A | 11/2000 | Hoese et al. | |
| 6,151,644 A | 11/2000 | Wu | |
| 6,158,014 A | 12/2000 | Henson | |
| 6,160,813 A | 12/2000 | Banks et al. | 370/422 |
| 6,185,203 B1 | 2/2001 | Berman | |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,246,683 B1 | 6/2001 | Connery et al. | |
| 6,247,060 B1 | 6/2001 | Boucher et al. | |
| 6,252,891 B1 | 6/2001 | Perches | |
| 6,253,267 B1 | 6/2001 | Kim et al. | |
| 6,278,708 B1 | 8/2001 | Von Hammerstein et al. | |
| 6,286,011 B1 | 9/2001 | Velamuri et al. | |
| 6,289,002 B1 | 9/2001 | Henson et al. | |
| 6,301,612 B1 | 10/2001 | Selitrennikoff et al. | |
| 6,307,857 B1 | 10/2001 | Yokoyama et al. | |
| 6,308,220 B1 | 10/2001 | Mathur | 709/238 |
| 6,311,204 B1 | 10/2001 | Mills et al. | |
| 6,324,181 B1 | 11/2001 | Wong et al. | 370/403 |
| 6,330,236 B1 | 12/2001 | Ofek et al. | 370/369 |
| 6,333,932 B1 | 12/2001 | Kobayasi et al. | |
| 6,335,935 B2 | 1/2002 | Kadambi et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,397,360 B1 | 5/2002 | Bruns | |
| 6,401,128 B1 | 6/2002 | Stai et al. | |
| 6,404,749 B1 | 6/2002 | Falk | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 | 7/2002 | Schwartz et al. | |
| 6,421,711 B1 | 7/2002 | Blumenau et al. | |
| 6,424,658 B1 | 7/2002 | Mathur | 370/429 |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,457,090 B1 | 9/2002 | Young | |
| 6,467,008 B1 | 10/2002 | Gentry et al. | |
| 6,470,026 B1 | 10/2002 | Pearson et al. | |
| 6,480,500 B1 | 11/2002 | Erimli et al. | |
| 6,509,988 B1 | 1/2003 | Saito | |
| 6,522,656 B1 | 2/2003 | Gridley | |
| 6,532,212 B1 | 3/2003 | Soloway et al. | |
| 6,553,036 B1 | 4/2003 | Miller et al. | |
| 6,563,796 B1 | 5/2003 | Saito | |
| 6,570,850 B1 | 5/2003 | Gutierrez et al. | |

| | | | | | | |
|---|---|---|---|---|---|---|
| 6,570,853 B1 * | 5/2003 | Johnson et al. ............. 370/236 | | 7,200,610 B1 | 4/2007 | Prawdiuk et al. |
| 6,594,231 B1 | 7/2003 | Byham et al. | | 7,209,478 B2 | 4/2007 | Rojas et al. |
| 6,597,691 B1 | 7/2003 | Anderson et al. ........... 370/360 | | 7,215,680 B2 | 5/2007 | Mullendore et al. |
| 6,597,777 B1 | 7/2003 | Ho | | 7,221,650 B1 | 5/2007 | Cooper et al. |
| 6,606,690 B2 | 8/2003 | Padovano | | 7,230,929 B2 | 6/2007 | Betker et al. |
| 6,614,796 B1 | 9/2003 | Black et al. | | 7,233,570 B2 | 6/2007 | Gregg |
| 6,622,206 B1 | 9/2003 | Kanamaru et al. | | 7,233,985 B2 | 6/2007 | Hahn et al. |
| 6,629,161 B2 | 9/2003 | Matsuki et al. | | 7,239,641 B1 | 7/2007 | Banks et al. |
| 6,643,298 B1 | 11/2003 | Brunheroto et al. | | 7,245,613 B1 | 7/2007 | Winkles et al. |
| 6,657,962 B1 | 12/2003 | Barri et al. | | 7,245,627 B2 | 7/2007 | Goldenberg et al. |
| 6,684,209 B1 | 1/2004 | Ito et al. | | 7,248,580 B2 | 7/2007 | George et al. |
| 6,697,359 B1 | 2/2004 | George ....................... 370/357 | | 7,263,593 B2 | 8/2007 | Honda et al. |
| 6,697,368 B2 | 2/2004 | Chang et al. | | 7,266,286 B2 | 9/2007 | Tanizawa et al. |
| 6,697,914 B1 | 2/2004 | Hospodor et al. | | 7,269,131 B2 | 9/2007 | Cashman et al. |
| 6,718,497 B1 | 4/2004 | Whitby-Strevens | | 7,269,168 B2 | 9/2007 | Roy et al. |
| 6,738,381 B1 | 5/2004 | Agnevik et al. | | 7,277,431 B2 | 10/2007 | Walter et al. |
| 6,744,772 B1 | 6/2004 | Eneboe et al. | | 7,287,063 B2 | 10/2007 | Baldwin et al. |
| 6,760,302 B1 | 7/2004 | Ellinas et al. | | 7,292,593 B1 | 11/2007 | Winkles et al. |
| 6,765,871 B1 | 7/2004 | Knobel et al. | | 7,315,511 B2 | 1/2008 | Morita et al. |
| 6,779,083 B2 | 8/2004 | Ito et al. | | 7,327,680 B1 | 2/2008 | Kloth |
| 6,785,241 B1 * | 8/2004 | Lu et al. ...................... 370/241 | | 7,346,707 B1 | 3/2008 | Erimli |
| 6,807,181 B1 | 10/2004 | Weschler | | 7,352,740 B2 | 4/2008 | Hammons et al. |
| 6,816,492 B1 | 11/2004 | Turner et al. | | 7,397,788 B2 | 7/2008 | Mies et al. |
| 6,816,750 B1 | 11/2004 | Klaas | | 7,406,034 B1 | 7/2008 | Cometto et al. |
| 6,859,435 B1 | 2/2005 | Lee et al. | | 7,424,533 B1 | 9/2008 | Di Benedetto et al. |
| 6,865,155 B1 | 3/2005 | Wong et al. | | 7,443,794 B2 | 10/2008 | George et al. |
| 6,865,157 B1 | 3/2005 | Scott et al. | | 7,460,534 B1 | 12/2008 | Ballenger |
| 6,886,141 B1 | 4/2005 | Kunz et al. | | 7,466,700 B2 | 12/2008 | Dropps et al. |
| 6,888,831 B1 | 5/2005 | Hospodor et al. | | 7,471,691 B2 | 12/2008 | Black et al. |
| 6,901,072 B1 | 5/2005 | Wong | | 2001/0011357 A1 | 8/2001 | Mori |
| 6,904,507 B2 | 6/2005 | Gil | | 2001/0022823 A1 | 9/2001 | Renaud |
| 6,922,408 B2 | 7/2005 | Bloch et al. | | 2001/0033552 A1 | 10/2001 | Barrack et al. |
| 6,928,470 B1 | 8/2005 | Hamlin | | 2001/0038628 A1 | 11/2001 | Ofek et al. |
| 6,934,799 B2 | 8/2005 | Acharya et al. | | 2001/0043564 A1 * | 11/2001 | Bloch et al. .................. 370/230 |
| 6,941,357 B2 | 9/2005 | Nguyen et al. | | 2001/0047460 A1 | 11/2001 | Kobayashi et al. |
| 6,941,482 B2 | 9/2005 | Strong | | 2002/0016838 A1 | 2/2002 | Geluc et al. |
| 6,947,393 B2 | 9/2005 | Hooper, III | | 2002/0034178 A1 | 3/2002 | Schmidt et al. |
| 6,952,659 B2 | 10/2005 | King et al. | | 2002/0071387 A1 | 6/2002 | Horiguchi et al. |
| 6,968,463 B2 | 11/2005 | Pherson et al. | | 2002/0103913 A1 | 8/2002 | Tawil et al. |
| 6,975,627 B1 | 12/2005 | Parry et al. | | 2002/0104039 A1 | 8/2002 | DeRolf et al. |
| 6,983,342 B2 | 1/2006 | Helenic et al. | | 2002/0118692 A1 | 8/2002 | Oberman et al. |
| 6,987,768 B1 | 1/2006 | Kojima et al. | | 2002/0122428 A1 | 9/2002 | Fan et al. |
| 6,988,130 B2 | 1/2006 | Blumenau et al. | | 2002/0124102 A1 | 9/2002 | Kramer et al. |
| 6,988,149 B2 | 1/2006 | Odenwald | | 2002/0124124 A1 | 9/2002 | Matsumoto et al. |
| 7,000,025 B1 | 2/2006 | Wilson | | 2002/0147560 A1 | 10/2002 | Devins et al. |
| 7,002,926 B1 | 2/2006 | Eneboe et al. | | 2002/0147843 A1 | 10/2002 | Rao |
| 7,010,607 B1 | 3/2006 | Bunton | | 2002/0156918 A1 | 10/2002 | Valdevit et al. |
| 7,024,410 B2 | 4/2006 | Ito et al. | | 2002/0159385 A1 | 10/2002 | Susnow et al. |
| 7,031,615 B2 | 4/2006 | Genrile | | 2002/0172195 A1 | 11/2002 | Pekkala et al. |
| 7,039,070 B2 | 5/2006 | Kawakatsu | | 2002/0174197 A1 | 11/2002 | Schimke et al. |
| 7,039,870 B2 | 5/2006 | Takaoka et al. | | 2002/0191602 A1 | 12/2002 | Woodring et al. |
| 7,047,326 B1 | 5/2006 | Crosbie et al. | | 2002/0194294 A1 | 12/2002 | Blumenau et al. |
| 7,050,392 B2 | 5/2006 | Valdevit | | 2002/0196773 A1 | 12/2002 | Berman |
| 7,051,182 B2 | 5/2006 | Blumenau et al. | | 2003/0002503 A1 | 1/2003 | Brewer et al. |
| 7,055,068 B2 | 5/2006 | Riedl | | 2003/0002516 A1 | 1/2003 | Boock et al. |
| 7,061,862 B2 | 6/2006 | Horiguchi et al. | | 2003/0016683 A1 | 1/2003 | George et al. |
| 7,061,871 B2 | 6/2006 | Sheldon et al. | | 2003/0021239 A1 | 1/2003 | Mullendore et al. |
| 7,076,569 B1 | 7/2006 | Bailey et al. | | 2003/0026267 A1 * | 2/2003 | Oberman et al. ............ 370/397 |
| 7,082,126 B2 | 7/2006 | Ain et al. | | 2003/0026287 A1 | 2/2003 | Mullendore et al. |
| 7,092,374 B1 | 8/2006 | Gubbi | | 2003/0033487 A1 | 2/2003 | Pfister et al. |
| 7,110,394 B1 | 9/2006 | Chamdani et al. | | 2003/0035433 A1 | 2/2003 | Craddock et al. |
| 7,120,728 B2 | 10/2006 | Krakirian et al. | | 2003/0046396 A1 | 3/2003 | Richter et al. |
| 7,123,306 B1 | 10/2006 | Goto et al. | | 2003/0056000 A1 | 3/2003 | Mullendore et al. |
| 7,124,169 B2 | 10/2006 | Shimozono et al. | | 2003/0063567 A1 | 4/2003 | Dehart |
| 7,150,021 B1 | 12/2006 | Vajjhala et al. | | 2003/0072316 A1 | 4/2003 | Niu et al. |
| 7,151,778 B2 | 12/2006 | Zhu et al. | | 2003/0076788 A1 | 4/2003 | Grabauskas et al. |
| 7,171,050 B2 | 1/2007 | Kim | | 2003/0079019 A1 | 4/2003 | Lolayekar et al. |
| 7,185,062 B2 | 2/2007 | Lolayekar et al. | | 2003/0084219 A1 | 5/2003 | Yao et al. |
| 7,187,688 B2 | 3/2007 | Garmire et al. | | 2003/0086377 A1 | 5/2003 | Berman |
| 7,188,364 B2 | 3/2007 | Volpano | | 2003/0091062 A1 | 5/2003 | Lay et al. |
| 7,190,667 B2 | 3/2007 | Susnow et al. | | 2003/0093607 A1 | 5/2003 | Main et al. |
| 7,194,538 B1 | 3/2007 | Rabe et al. | | 2003/0103451 A1 | 6/2003 | Lutgen et al. |
| 7,200,108 B2 | 4/2007 | Beer et al. | | 2003/0112819 A1 | 6/2003 | Kofoed et al. |

| | | | | | | |
|---|---|---|---|---|---|---|
| 2003/0115355 | A1 | 6/2003 | Cometto et al. | 2005/0111845 | A1 | 5/2005 | Nelson et al. |
| 2003/0117961 | A1 | 6/2003 | Chuah et al. | 2005/0117522 | A1 | 6/2005 | Basavaiah et al. |
| 2003/0118053 | A1 | 6/2003 | Edsall et al. | 2005/0177641 | A1 | 8/2005 | Yamagami |
| 2003/0120743 | A1 | 6/2003 | Coatney et al. | 2005/0198523 | A1 | 9/2005 | Shanbhag et al. |
| 2003/0120791 | A1 | 6/2003 | Weber et al. | 2006/0013248 | A1 | 1/2006 | Mujeeb et al. |
| 2003/0120983 | A1 | 6/2003 | Vieregge et al. | 2006/0034192 | A1 | 2/2006 | Hurley et al. |
| 2003/0126223 | A1* | 7/2003 | Jenne et al. ............... 709/212 | 2006/0034302 | A1 | 2/2006 | Peterson |
| 2003/0126242 | A1 | 7/2003 | Chang | 2006/0074927 | A1 | 4/2006 | Sullivan et al. |
| 2003/0131105 | A1 | 7/2003 | Czeiger et al. | 2006/0107260 | A1 | 5/2006 | Motta |
| 2003/0137941 | A1 | 7/2003 | Kaushik et al. | 2006/0143300 | A1 | 6/2006 | See et al. |
| 2003/0139900 | A1* | 7/2003 | Robison ............... 702/179 | 2006/0184711 | A1 | 8/2006 | Pettey |
| 2003/0172149 | A1 | 9/2003 | Edsall et al. | 2006/0203725 | A1 | 9/2006 | Paul et al. |
| 2003/0172239 | A1 | 9/2003 | Swank | 2006/0274744 | A1 | 12/2006 | Nagai et al. |
| 2003/0174652 | A1 | 9/2003 | Ebata | 2007/0206502 | A1 | 9/2007 | Martin et al. |
| 2003/0174721 | A1 | 9/2003 | Black et al. | | | | |
| 2003/0174789 | A1 | 9/2003 | Waschura et al. | | | | |
| 2003/0179709 | A1 | 9/2003 | Huff | | | | |
| 2003/0179748 | A1 | 9/2003 | George et al. ............... 370/389 | | | | |
| 2003/0179755 | A1 | 9/2003 | Fraser | | | | |
| 2003/0189930 | A1 | 10/2003 | Terrell et al. | | | | |
| 2003/0189935 | A1 | 10/2003 | Warden et al. | | | | |
| 2003/0191857 | A1 | 10/2003 | Terrell et al. | | | | |
| 2003/0195983 | A1 | 10/2003 | Krause | | | | |
| 2003/0198238 | A1 | 10/2003 | Westby | | | | |
| 2003/0200315 | A1 | 10/2003 | Goldenberg et al. | | | | |
| 2003/0218986 | A1 | 11/2003 | DeSanti et al. | | | | |
| 2003/0229808 | A1 | 12/2003 | Heintz et al. | | | | |
| 2003/0236953 | A1 | 12/2003 | Grieff et al. | | | | |
| 2004/0013088 | A1 | 1/2004 | Gregg | | | | |
| 2004/0013092 | A1 | 1/2004 | Betker et al. | | | | |
| 2004/0013113 | A1 | 1/2004 | Singh et al. | | | | |
| 2004/0013125 | A1 | 1/2004 | Betker et al. | | | | |
| 2004/0015638 | A1 | 1/2004 | Forbes | | | | |
| 2004/0024831 | A1 | 2/2004 | Yang et al. | | | | |
| 2004/0027989 | A1 | 2/2004 | Martin et al. | | | | |
| 2004/0028038 | A1 | 2/2004 | Anderson et al. | | | | |
| 2004/0054776 | A1 | 3/2004 | Klotz et al. | | | | |
| 2004/0054866 | A1 | 3/2004 | Blumenau et al. | | | | |
| 2004/0057389 | A1 | 3/2004 | Klotz et al. | | | | |
| 2004/0064664 | A1 | 4/2004 | Gil | | | | |
| 2004/0081186 | A1 | 4/2004 | Warren et al. | | | | |
| 2004/0081196 | A1 | 4/2004 | Elliott | | | | |
| 2004/0081394 | A1 | 4/2004 | Biren et al. | | | | |
| 2004/0085955 | A1 | 5/2004 | Walter et al. | | | | |
| 2004/0085974 | A1 | 5/2004 | Mies et al. | | | | |
| 2004/0085994 | A1 | 5/2004 | Warren et al. | | | | |
| 2004/0092278 | A1 | 5/2004 | Diepstraten et al. | | | | |
| 2004/0100944 | A1 | 5/2004 | Richmond et al. | | | | |
| 2004/0109418 | A1 | 6/2004 | Fedorkow et al. | | | | |
| 2004/0123181 | A1 | 6/2004 | Moon et al. | | | | |
| 2004/0125799 | A1 | 7/2004 | Buer | | | | |
| 2004/0141518 | A1 | 7/2004 | Milligan et al. | | | | |
| 2004/0141521 | A1 | 7/2004 | George ............... 370/463 | | | | |
| 2004/0151188 | A1 | 8/2004 | Maveli et al. | | | | |
| 2004/0153526 | A1 | 8/2004 | Haun et al. | | | | |
| 2004/0153566 | A1* | 8/2004 | Lalsangi et al. ............... 709/234 | | | | |
| 2004/0153863 | A1 | 8/2004 | Klotz et al. | | | | |
| 2004/0153914 | A1 | 8/2004 | El-Batal | | | | |
| 2004/0174813 | A1 | 9/2004 | Kasper et al. | | | | |
| 2004/0202189 | A1 | 10/2004 | Arndt et al. | | | | |
| 2004/0208201 | A1 | 10/2004 | Otake | | | | |
| 2004/0218531 | A1 | 11/2004 | Cherian et al. | | | | |
| 2004/0267982 | A1 | 12/2004 | Jackson et al. | | | | |
| 2005/0018673 | A1 | 1/2005 | Dropps et al. | | | | |
| 2005/0023656 | A1 | 2/2005 | Leedy | | | | |
| 2005/0036485 | A1* | 2/2005 | Eilers et al. ............... 370/389 | | | | |
| 2005/0036499 | A1 | 2/2005 | Dutt et al. | | | | |
| 2005/0036763 | A1 | 2/2005 | Kato et al. | | | | |
| 2005/0047334 | A1 | 3/2005 | Paul et al. | | | | |
| 2005/0073956 | A1 | 4/2005 | Moores et al. | | | | |
| 2005/0076113 | A1 | 4/2005 | Klotz et al. | | | | |
| 2005/0088969 | A1 | 4/2005 | Carlsen et al. | | | | |
| 2005/0108444 | A1 | 5/2005 | Flauaus et al. | | | | |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

Matavalli et al. "Fibre Channel Fraimg and Signaling (FC-FS) REV 1.10", BCITS working draft proposed American National Standard for Information Technology, Jan. 25, 2001. (This document was previously provided in the Office Action for this case mailed on Nov. 13, 2007).*

International Preliminary Report on Patentability Dated Apr. 3, 2007, for International patent Application No. PCT/US2005/034844.

International Preliminary Report on Patentability Dated Apr. 3, 2007, for International patent Application No. PCT/US2005/034758.

International Preliminary Report on Patentability Dated Apr. 11, 2007, for International patent Application No. PCT/US2005/034845.

International Preliminary Report on Patentability Dated Apr. 3, 2007, for International patent Application No. PCT/US2005/035064.

International Preliminary Report on Patentability Dated Jul. 24, 2007, for International patent Application No. PCT/US2005/42528.

Banks, David C., et al., "Link Trunking and Measuring Link Latency in Fibre Channel Fabric", U.S. Appl. No. 60/286,046, 1-52.

Brown, Douglas W., "A State-Machine Synthesizer", *18th Design Automation Conference*, (1981),301-305.

"Deliver Server-Free Backup", *Pathlight & Computer Associates*, White Paper of Apr. 2000, Ithaca, New York, XP-002381153,1-8.

Naik, D. , "Inside Windows Storage:Server Storage Technologies for Windows 2000, Windows Server 2003 and Beyond", *Addison-Wesley*, US, Chapter 5, XP-002381152, (Jul. 15, 2003),137-173.

Curtis, A. R., "Design Considerations for 10-Gbit Fibre Channel", *Curtis A. Ridgeway, Distinguished I/O Architect, Storage and Computing ASIC's Division, LSI Logic Corp*.

Malavalli, Kumar , "High Speed Fibre Channel Switching Fabric Devices", *Proceedings of the SPIE, SPIE*, Bellingham, VA, USA vol. 1577., XP000562869, ISSN: 0277-786X,(Sep. 4, 1991),216-226.

Melhem, et al., "Minimizing Wavelength Conversions in WDM Path Establishment", *Computer Science Department, Univerisity of Pittsburgh*, Pittsburgh, PA 15260, (2001),197-211.

Ridgeway, Curt , "0GFC-40GFC using 4-lane XAUI's", *LSI Logic Presentation—T11/03-069v0*.

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.
Martin et al , "Virtual Channel Architecture", Presentation by Brocade to T11/03-369V0 dated Jun. 2, 2003.
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Sep. 6, 2007 for U.S. Appl. No. 10/889,337".
"Office Action from USPTO dated Dec. 7, 2007 for U.S. Appl. No. 10/961,463".
"Office Action from USPTO dated Mar. 7, 2008 for U.S. Appl. No. 10/894,629".
"Notice of Allowance from USPTO dated Dec. 21, 2007 for U.S. Appl. No. 10/961,463".
"Notice of Allowance from USPTO dated Dec. 20, 2007 for U.S. Appl. No. 10/889,337".
"Office Action from USPTO dated Jan. 9, 2008 for U.S. Appl. No. 10/798,468".
"Office Action from USPTO dated Jan. 9, 2008 for U.S. Appl. No. 11/608,634".
"Notice of Allowance from USPTO dated Jan. 11, 2008 for U.S. Appl. No. 10/664,548".
"Notice of Allowance from USPTO dated Feb. 8, 2008 for U.S. Appl. No. 10/894,529".
"Office Action from USPTO dated Mar. 5, 2008 for U.S. Appl. No. 10/889,259".
"Notice of Allowance from USPTO dated Jan. 8, 2008 for U.S. Appl. No. 10/889,551".
"Notice of Allowance from USPTO dated Jan. 10, 2008 for U.S. Appl. No. 10/263,858".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 for U.S. Appl. No. 10/664,548".
"Office Action from USPTO dated Sep. 20, 2007 for U.S. Appl. No. 10/798,527".
"Office Action from USPTO dated Feb. 12, 2008 for U.S. Appl. No. 11/057,912".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Mar. 20, 2008 for U.S. Appl. No. 10/894,732".
"Notice of Allowance from USPTO dated Apr. 10, 2008 for U.S. Appl. No. 10/241,153".
"Office Action from USPTO dated Apr. 11, 2008 for U.S. Appl. No. 10/894,595".
"Office Action from USPTO dated Apr. 14, 2008 for U.S. Appl. No. 10/894,627".
"Office Action from USPTO dated Apr. 17, 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 25, 2008 for U.S. Appl. No. 10/894,579".
"Final Office Action from USPTO dated Apr. 1, 2008 for U.S. Appl. No. 10/956,717".
"Office Action from USPTO dated Apr. 4, 2008 for U.S. Appl. No. 10/957,465".
"Office Action from USPTO dated Apr. 3, 2008 for U.S. Appl. No. 10/894,587".
"Notice of Allowance from USPTO dated Apr. 4, 2008 for U.S. Appl. No. 11/608,634".
"Examination Report from the European Patent Office dated Oct. 12, 2007 for European Application No. 05 805 632.6".
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Jul. 9, 2008 for U.S. Appl. No. 10/894,579".
"Notice of Allowance from USPTO dated Jul 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Final Office Action from USPTO Dated Aug. 4, 2008 for U.S. Appl. No. 10/894,732".
"Notice of Allowance from USPTO dated August 18, 2008 for U.S. Appl. No. 10/889,259".
"Final Office Action from USPTO dated Aug. 20, 2008 for U.S. Appl. No. 10/798,468".
"Office Action from USPTO dated Sep. 18, 2008 for U.S. Appl. No. 10/894,978".
"Office Action from USPTO dated Sep. 23, 2008 for U.S. Appl. No. 12/031,585".
"Notice of Allowance from the USPTO dated Sep. 29, 2008 for U.S. Appl. No. 10/889,267".
"Final Office Action from USPTO dated Oct. 8, 2008 for U.S. Appl. No. 11/057,912".

"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Notice of Allowance from USPTO dated Oct. 15, 2008 for U.S. Appl. No. 10/894,492".
"Final Office Action from USPTO dated Oct. 17, 2008 for U.S. Appl. No. 10/894,595".
"Final Cffice Action from USPTO dated Jun. 4, 2008 for U.S. Appl. No. 10/894,978".
"Final Office Action from USPTO dated Jun. 5, 2008 for U.S. Appl. No. 10/889,267".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Office Action from USPTO dated Jun. 27, 2008 for U.S. Appl. No. 10/894,726".
"Final Office Action from USPTO dated Nov. 13, 2008 for U.S. Appl. No. 10/894,587".
"Office Action from USPTO dated Nov. 13, 2008 for U.S. Appl. No. 10/894,917".
"Office Action from USPTO dated Nov. 26, 2008 for U.S. Appl. No. 10/956,502".
"Office Action from USPTO dated Nov. 26, 2008 for U.S. Appl. No. 10/894,547".
"Final Office Action from USPTO dated Dec. 24, 2008 for U.S. Appl. No. 10/894,726".
"Office Action from USPTO dated Dec. 23. 2008 for U.S. Appl. No. 10/798,468".
"Notice of Allowance from USPTO dated Dec. 30, 2008 for U.S. Appl. No. 11/037,922".
"Final Office Action from USPTO dated Jan. 21, 2009 for U.S. Appl. No. 10/894,827".
"Final Office Action from USPTO dated Jan. 26, 2009 for U.S. Appl. No. 10/895,175".
"Notice of Allowance from USPTO dated Feb. 10, 2009 for U.S. Appl. No. 10/894,595".
"Office Action from USPTO dated Feb. 7, 2009 for U.S. Appl. No. 10/894,732".
"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".
"Notice of Allowance from USPTO dated Mar. 6, 2009 for U.S. Appl. No. 10/956,502".
"Office Action from USPTO dated Mar. 9, 2009 for U.S. Appl. No. 1/057,912".
"Notice of Allowance from USPTO dated Mar. 9, 2009 for U.S. Appl. No. 10/889,635".
"Office Action from USPTO dated Mar. 16, 2009 for U.S. Appl. No. 10/956,501".
"Notice of Allowance from USPTO dated Mar. 20, 2009 for U.S. Appl. No. 10/894,978".
"Notice of Allowance from USPTO dated Mar. 23, 2009 for U.S. Appl. No. 12/198,644".
"Office Action from USPTO dated Mar. 25, 2009 for U.S. Appl. No. 10/894,546".
"Notice of Allowance from USPTO dated Mar. 31, 2009 for U.S. Appl. No. 12/031,585".
"Office Action from USPTO dated Apr. 2, 2009 for U.S. Appl. No. 10/889,256".
"Examination Report from European Patent Office dated Mar. 27, 2009 for European Application No. 05798761.2".
"Notice of Allowance from USPTO dated May 5, 2009 for U.S. Appl. No. 10/798,468".
"Office Action from USPTO dated May 14, 2009 for U.S. Appl. No. 11/682,199".
"Notice of Allowance from USPTO dated May 18, 2009 for U.S. Appl. No. 10/894,917".
"Notice of Allowance from USPTO dated May 26, 2009 for U.S. Appl. No. 10/894,627".
"Office Action from USPTO dated Jun. 25, 2009 for U.S. Appl. No. 10/894,547".
"Notice of Allowance from USPTO dated Jul. 6, 2009 for U.S. Appl. No. 10/894,587".
"Notice of Allowance from USPTO dated Jul. 9, 2009 for U.S. Appl. No. 10/894,726".
"Office Action from USPTO dated Jul. 23, 2009 for U.S. Appl. No. 10/894,732".
"Office Action from Chinese State Intellectual Property Office dated Jul. 10, 2009 for Chinese Application No. 200580032888.6".
"Final Office Action from USPTO dated Apr. 29, 2008 for U.S. Appl. No. 10/894,491".
"Office Action from USPTO dated May 2, 2008 for U.S. Appl. No. 11/037,922".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 15, 2008 for U.S. Appl. No. 10/798,527".
"Final Office Action from USPTO dated May 21, 2008 for U.S. Appl. No. 10/889,635".

* cited by examiner

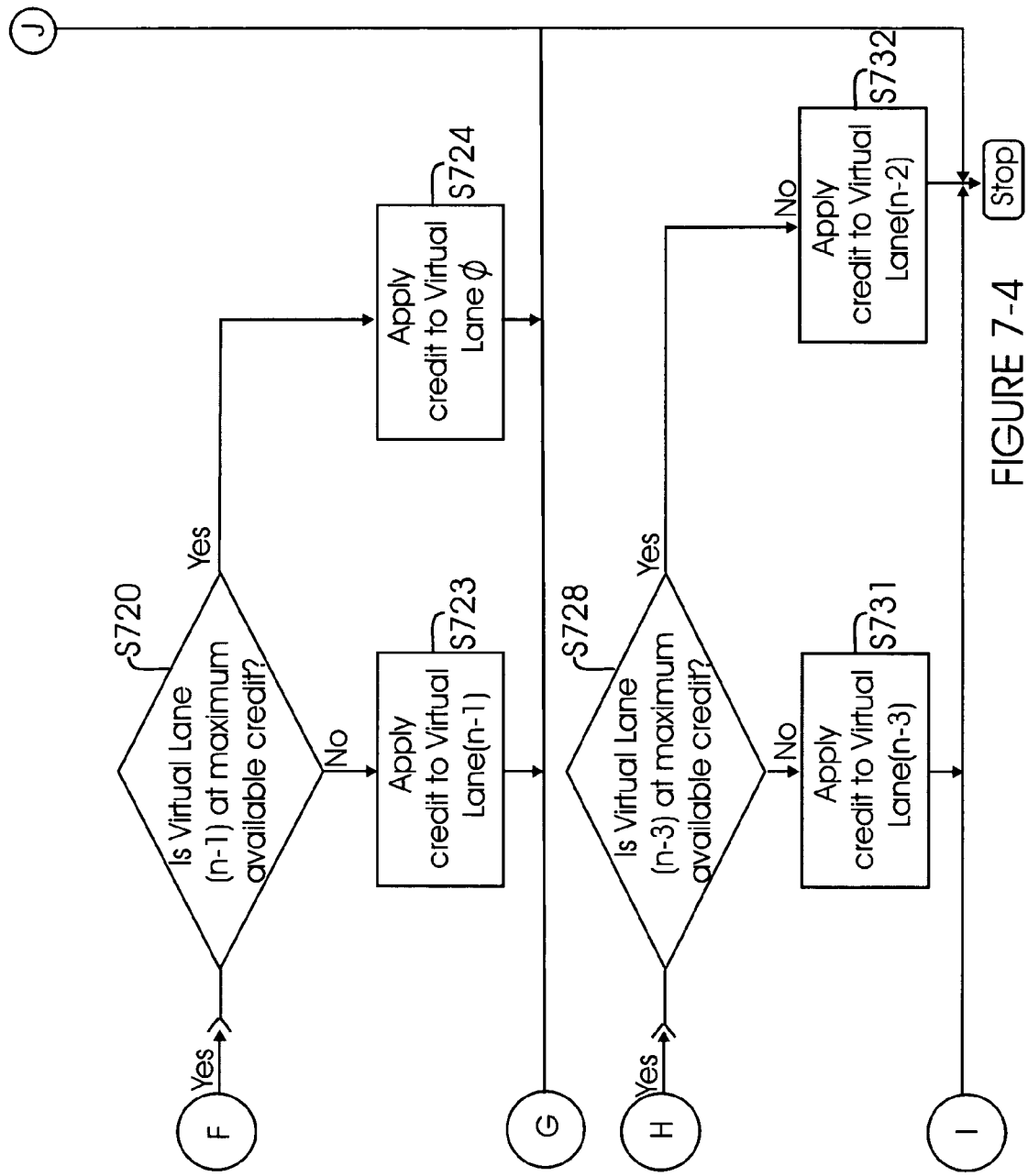

METHOD AND SYSTEM FOR DISTRIBUTING CREDIT IN FIBRE CHANNEL SYSTEMS

CROSS REFERENCE TO RELATED APPLICATIONS

This application claims priority under 35 U.S.C.§ 119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled" Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network";

Filed on Aug. 14, 2003, Ser. No. 60/495,165, entitled "LUN Based Hard Zoning in Fibre Channel Switches";

Filed on Sep. 19, 2003, Ser. No. 60/503,809, entitled "Multi Speed Cut Through Operation in Fibre Channel Switches";

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane";

Filed on Dec. 29, 2003, Ser. No. 60/532,966, entitled "Method And System For Using Extended Fabric Features With Fibre Channel Switch Elements";

Filed on Mar. 4, 2004, Ser. No. 60/550,250, entitled "Method And System for Programmable Data Dependent Network Routing";

Filed on May 7, 2004, Ser. No. 60/569,436, entitled "Method And System For Congestion Control In A Fibre Channel Switch";

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly, to credit recovery involving virtual lanes.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

Fibre channel switches use "virtual lanes" (or virtual channels) to allocate receive credits at an E_port. Virtual lanes are a portion of the data path between a source and destination port.

In Fibre Channel, buffer-to-buffer credit mechanism is used to control frame flow on a Fibre Channel link to prevent the inability to deliver any frames because of lost R_RDYs or lost frames. Fibre Channel point-to-point links lose credit when an R_RDY or a SOFx is corrupted in transit. As credit is lost, performance degrades until frame timeouts occur. Then the only recourse is to reset the link.

The Fibre Channel standard has a credit recovery mechanism for lost R_RDYs or lost frames. Both ports on the link must support Fibre Channel credit recovery before it can be enabled.

Fibre Channel credit recovery defines BB_SC_N, a number from 0 to 15 and two primitive signals, BB_SCr and BB_SCs for credit recovery. When BB_SC_N is not zero, credit recovery is enabled. Two credit recovery operations are used, one for lost frame(s) and another for lost R_RDY(s).

For lost frame(s) credit recovery, BB_SCs are transmitted whenever 2**BB_SC_N frames have been transmitted since the last BB_SC was transmitted. The receiving port counts the number of frames received between received BB_SCs primitive signals and if the number is less than 2*BB_SC_N, it transmits as many R_RDYs as frames were lost back to the originator of the frames. Thus the originator does not lose credit for transmitting more frames.

For lost R_RDY(s) credit recovery, BB_SCr is transmitted whenever 2**BB_SC_N R_RDYs have been transmitted since the last BB_SCr was transmitted. The receiving port counts the number of R_RDYs received between received BB_SCr primitive signals and if the number is less than 2*BB_SC_N, it adds the lost number of credits to its credit counter. Thus a receiver does not lose credit for transmitting more frames.

The present fibre channel standard does not provide any guidance regarding the foregoing credit recovery methodology if virtual or pseudo virtual lanes are used. The current fibre channel standards as well as conventional fibre channel switches do not have a system or methodology for detecting loss of credit and then allocating the credit to the proper virtual/pseudo virtual lane.

As fibre channel systems become more complex and operate in higher bandwidth environments, credit recovery and proper credit allocation become essential for overall system performance. Therefore, what is required is a process and system that efficiently detects credit loss and allocates credit to the proper virtual/pseudo lanes.

SUMMARY OF THE PRESENT INVENTION

In one aspect of the present invention, a method for distributing credit in a fibre channel system using a fibre channel switch element is provided. The method includes, determining if a VC_RDY primitive is received; and allocating credit to a virtual lane that is not at its maximum credit, after the VC_RDY primitive is received. Plural virtual lanes are analyzed iteratively to determine if the virtual lanes have maximum credit. If a VC_RDY primitive is received, a counter is modified.

In another aspect of the present invention, a method for distributing credit in a fibre channel system using a fibre channel switch element is provided. The method includes, detecting lost credit if fewer VC_RDYs or R_RDYs are received between BB_SCrs; and assigning the lost credit to an appropriate virtual lane. Lost credit is assigned to a lane, which is next to a virtual lane that has reached its maximum credit. If a VC_RDY is received for a last virtual lane that has reached its maximum credit, then credit is passed to a lowest number port that has not reached its maximum credit.

In yet another aspect of the present invention, a method for distributing credit in a fibre channel system using a fibre channel switch element is provided. The method includes, determining if BB_SCs were lost or if an extra frame is received, when a frame arrives if the fibre channel switch element is expecting BB_SCs; and setting a status bit indicating if a BB_SC was lost or an extra frame was received. The status bit is set in a register in a common segment of the fibre channel switch element.

In yet another aspect of the present invention, a fibre channel switch element for routing fibre channel frames is provided. The switch element includes, a wait threshold counter that is used to set up a status for a port that has to wait for certain duration to send a frame due to lack of buffer to buffer credit;

a credit module that controls buffer to buffer credit for a transmit segment of the fibre channel switch element; and a virtual lane credit module with a counter that is incremented every time a frame assigned to a virtual lane is sent and decreased every time a VC_RDY is received. The credit module has a counter that is increased whenever a frame is transmitted and is decreased whenever a R_RDY or VC_RDY is sent.

Also included is a BB_SC logic module that generates a status signal if more than a threshold number of frame credit losses are detected. If lost frames are detected, then BB_SC logic generates equivalent number of R_RDY primitives that should have been received and sends the R_RDY primitives to a device on another end of a link.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

Figure 1A:
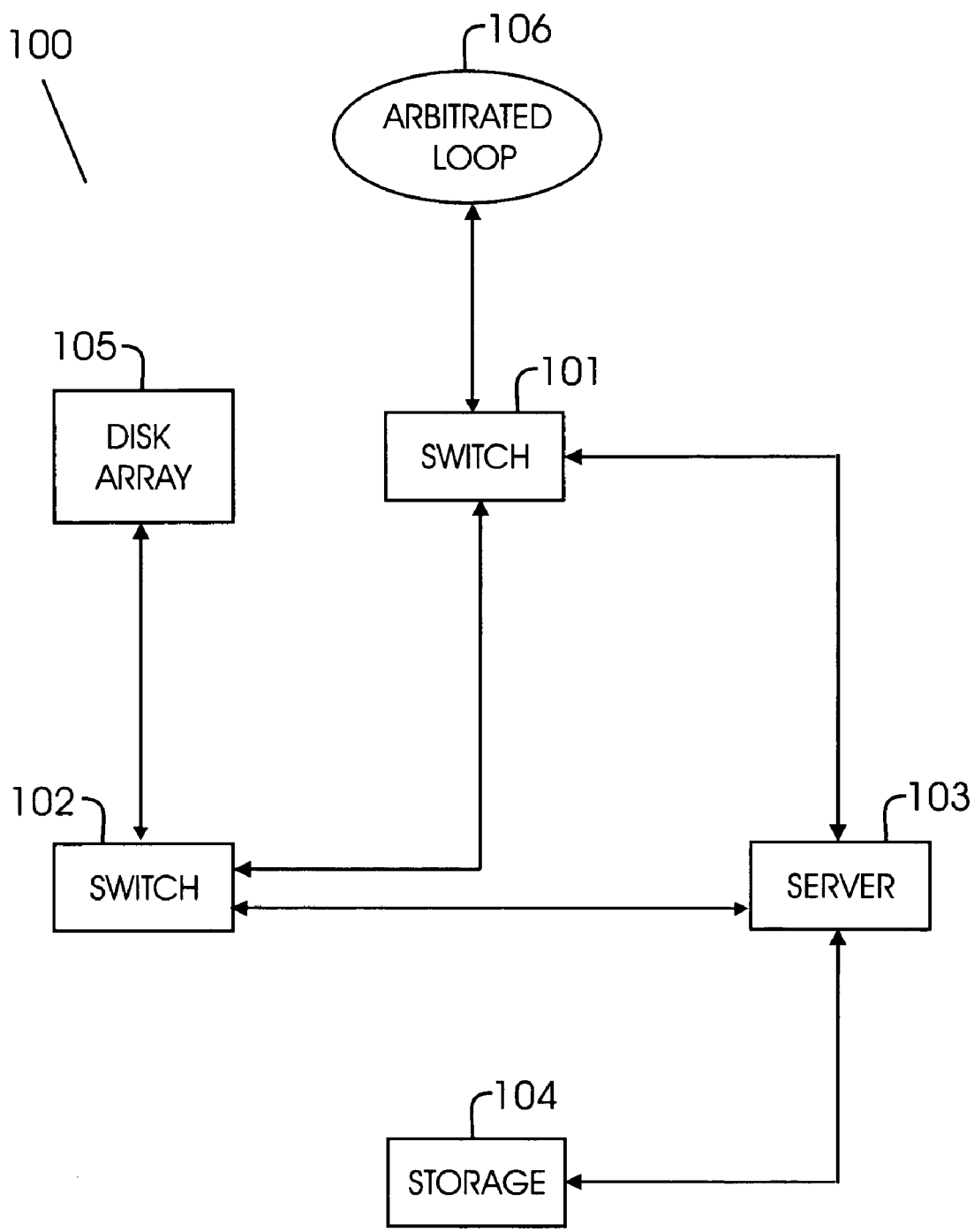
FIG. 1A shows an example of a Fibre Channel network system.

The following definitions are provided as they are typically (but not exclusively) used in the fibre channel environment, implementing the various adaptive aspects of the present invention.

"BB_SCs": Flow control primitive signal used for credit recovery involving lost frames.

"BB_SCr": Flow control primitive signal used for credit recovery of lost R_RDYs.

"CL2": Class 2 fibre channel frames;

"CL3": Class 3 fibre channel frames;

"E-Port": A fabric expansion port that attaches to another Interconnect port to create an Inter-Switch Link.

"F_Port": A port to which non-loop N_Ports are attached to a fabric and does not include FL_ports.

"Fibre channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

Port: A general reference to N. Sub.--Port or F.Sub.--Port.

"L_Port": A port that contains Arbitrated Loop functions associated with the Arbitrated Loop topology.

"N-Port": A direct fabric attached port.

"NL_Port": A L_Port that can perform the function of a N_Port.

"Pseudo Virtual Lanes" ("PVL") are used to minimize congestion and can be used on E_Port, F_Ports or N_Ports that are connected to devices that do not support virtual lanes.

"R_RDY": Flow control primitive signal used for establishing credit. Receiving an R_RDY frame increases credit, while sending a R_RDY frame decreases credit.

"Switch": A fabric element conforming to the Fibre Channel Switch standards.

"VL" (Virtual Lane): A virtual portion of the data path between a source and destination port each having independent buffer to buffer flow control.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
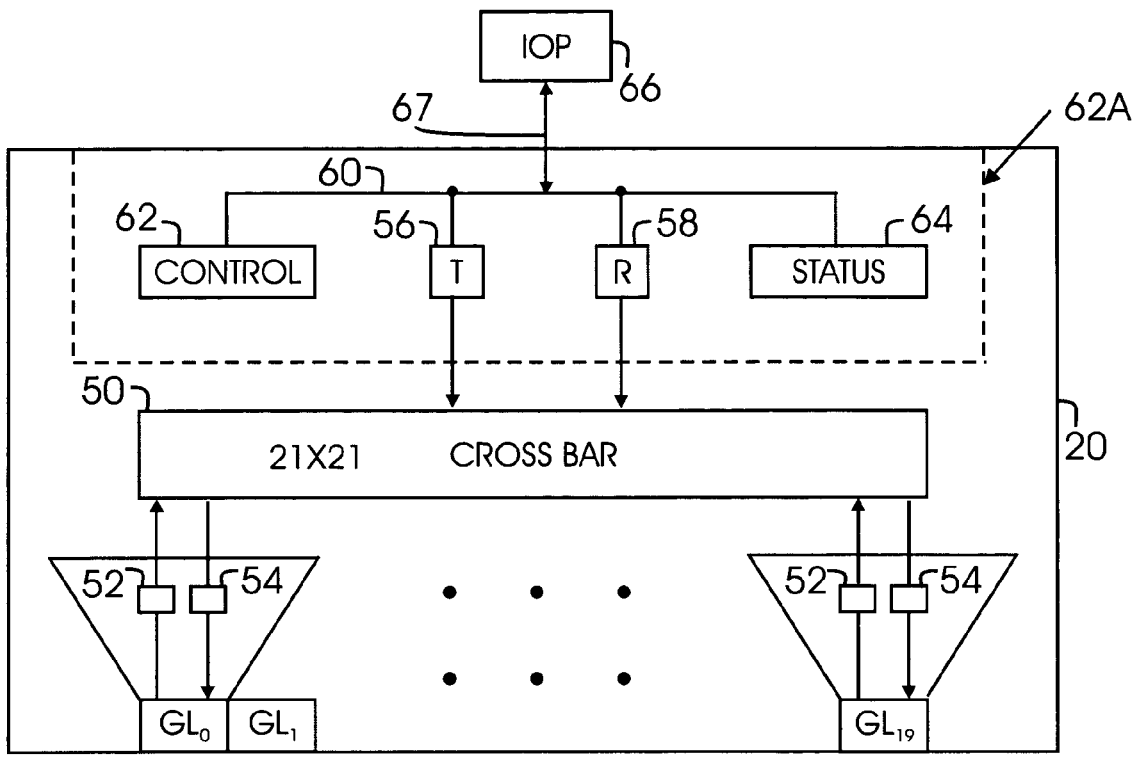
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
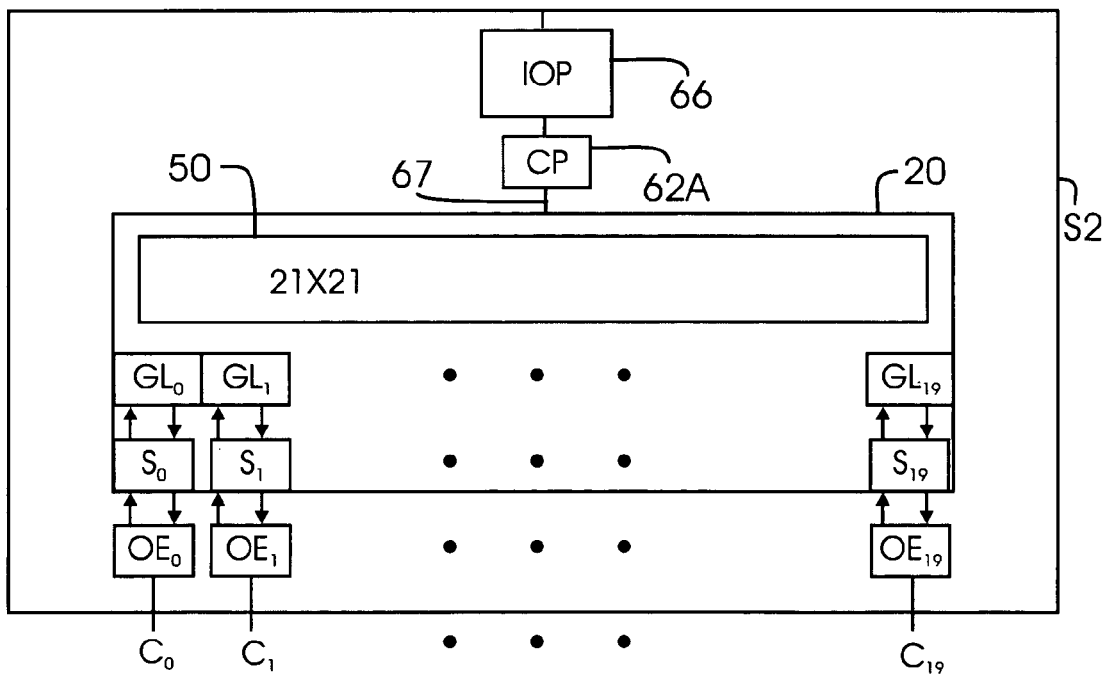
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel C0-C19. Each GL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 5:
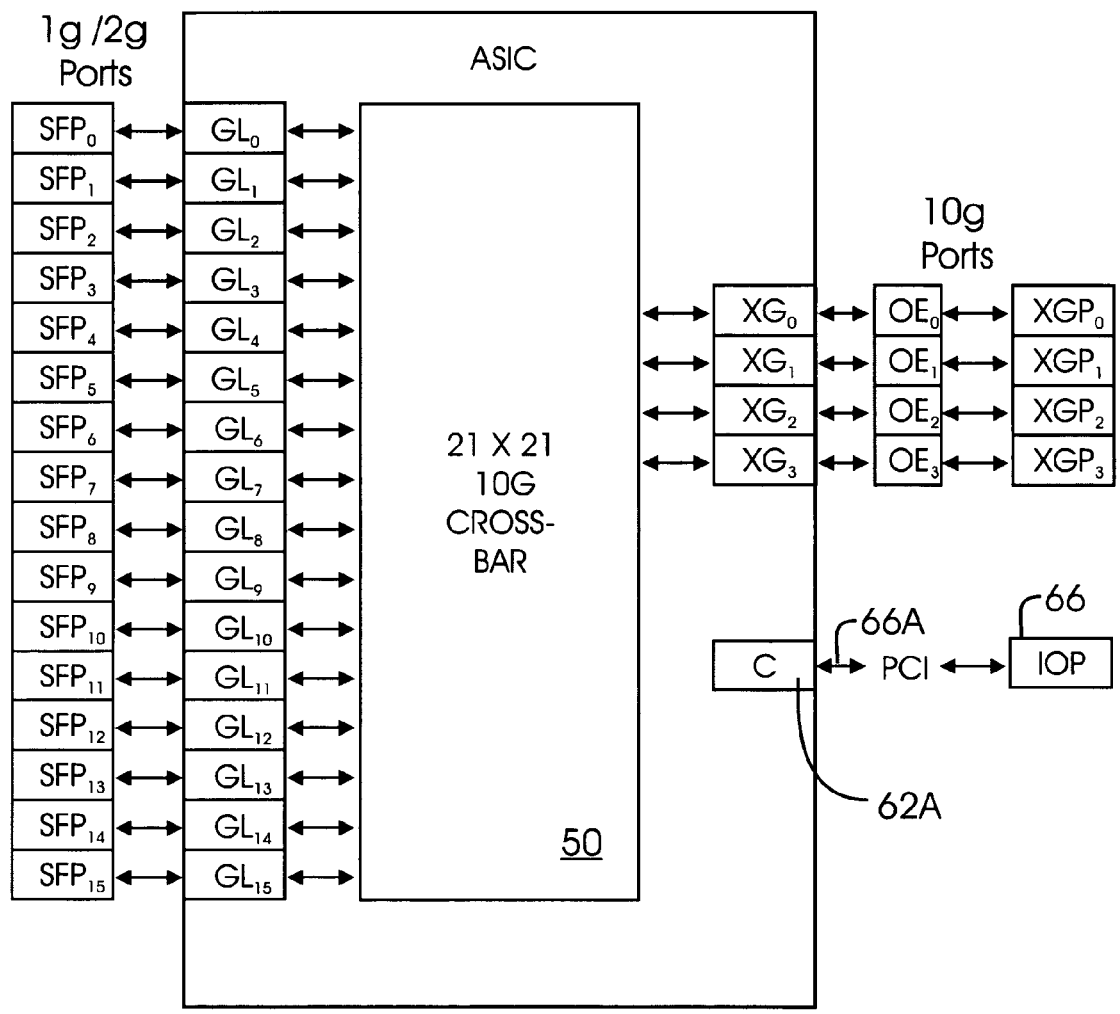
FIG. 5 shows a block diagram of a Fibre Channel switch element with sixteen GL_Ports and four 10 G ports, according to one aspect of the present invention.

FIG. 5 shows a block diagram of ASIC 20 with sixteen GL_Ports designated as GL0-GL15 and four 10 G port control modules designated as XG0-XG3. ASIC 20 includes a control port 62A that is coupled to IOP 66 through a PCI connection 66A.

Figure 2A:
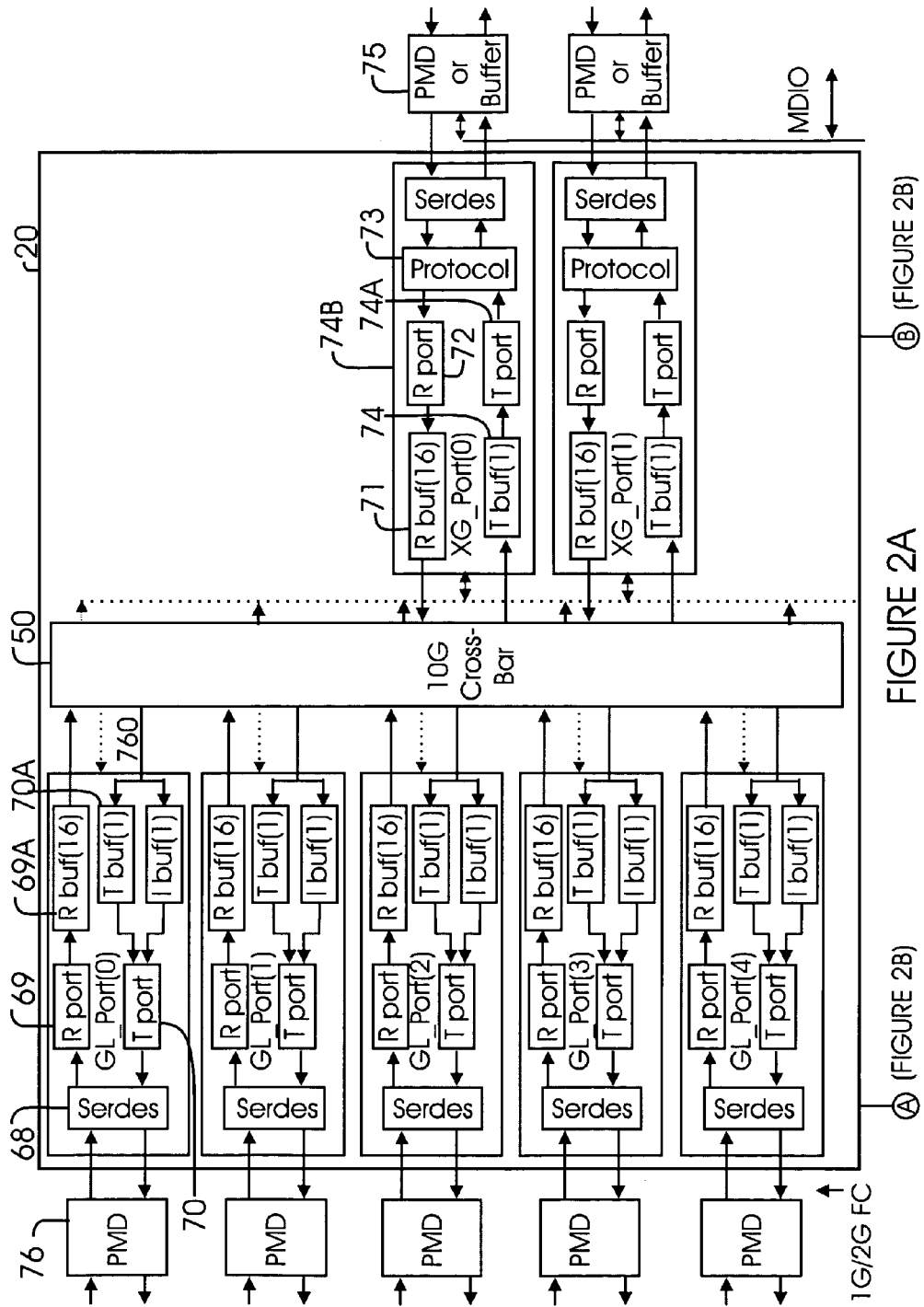
FIGS. 2A/2B (jointly referred to as FIG. 2) shows another block diagram of a Fibre Channel switch element with sixteen GL_Ports and four 10 G ports, according to one aspect of the present invention.
Figure 2B:
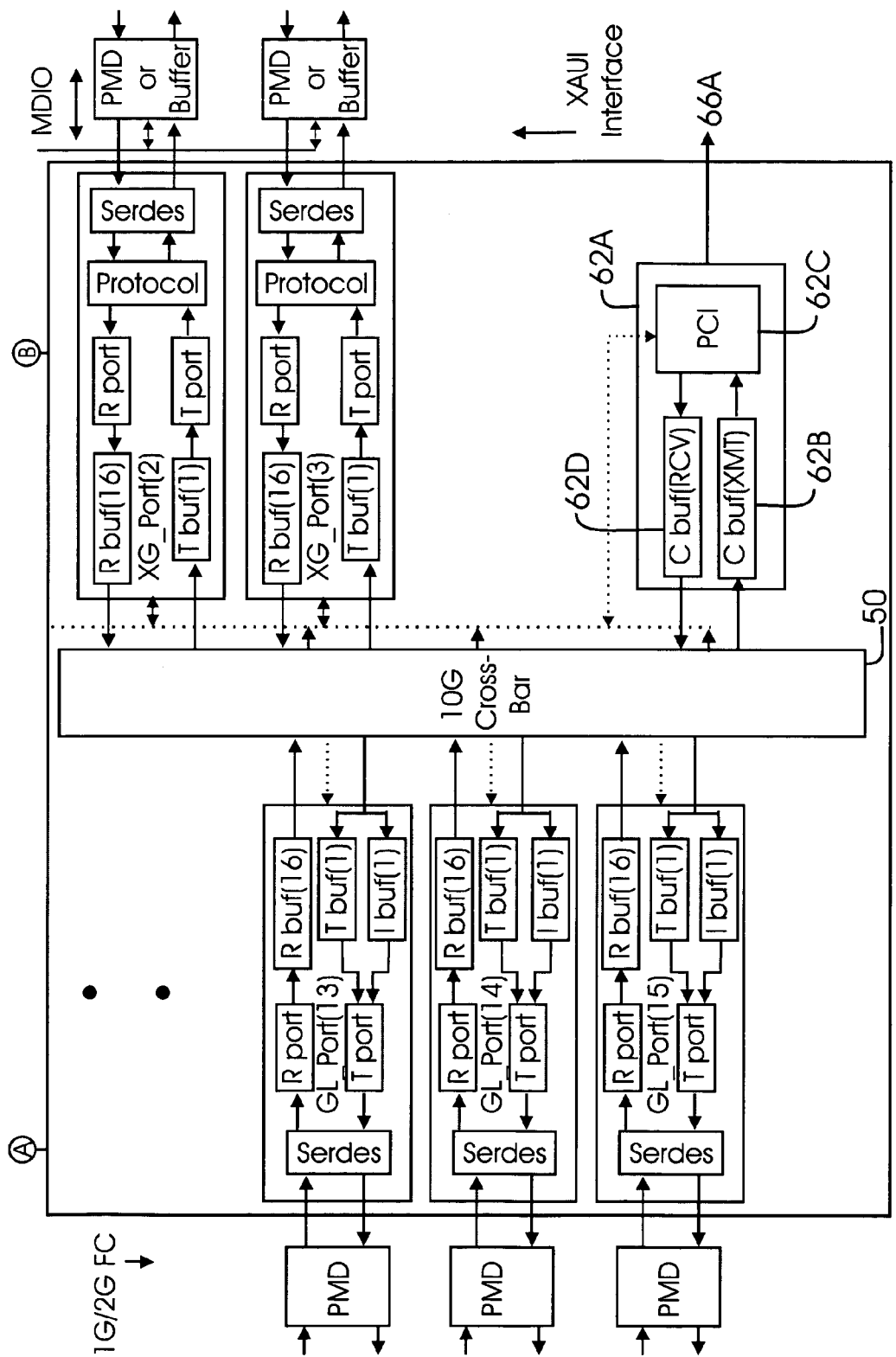

FIGS. 2A/2B (jointly referred to as FIG. 2) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
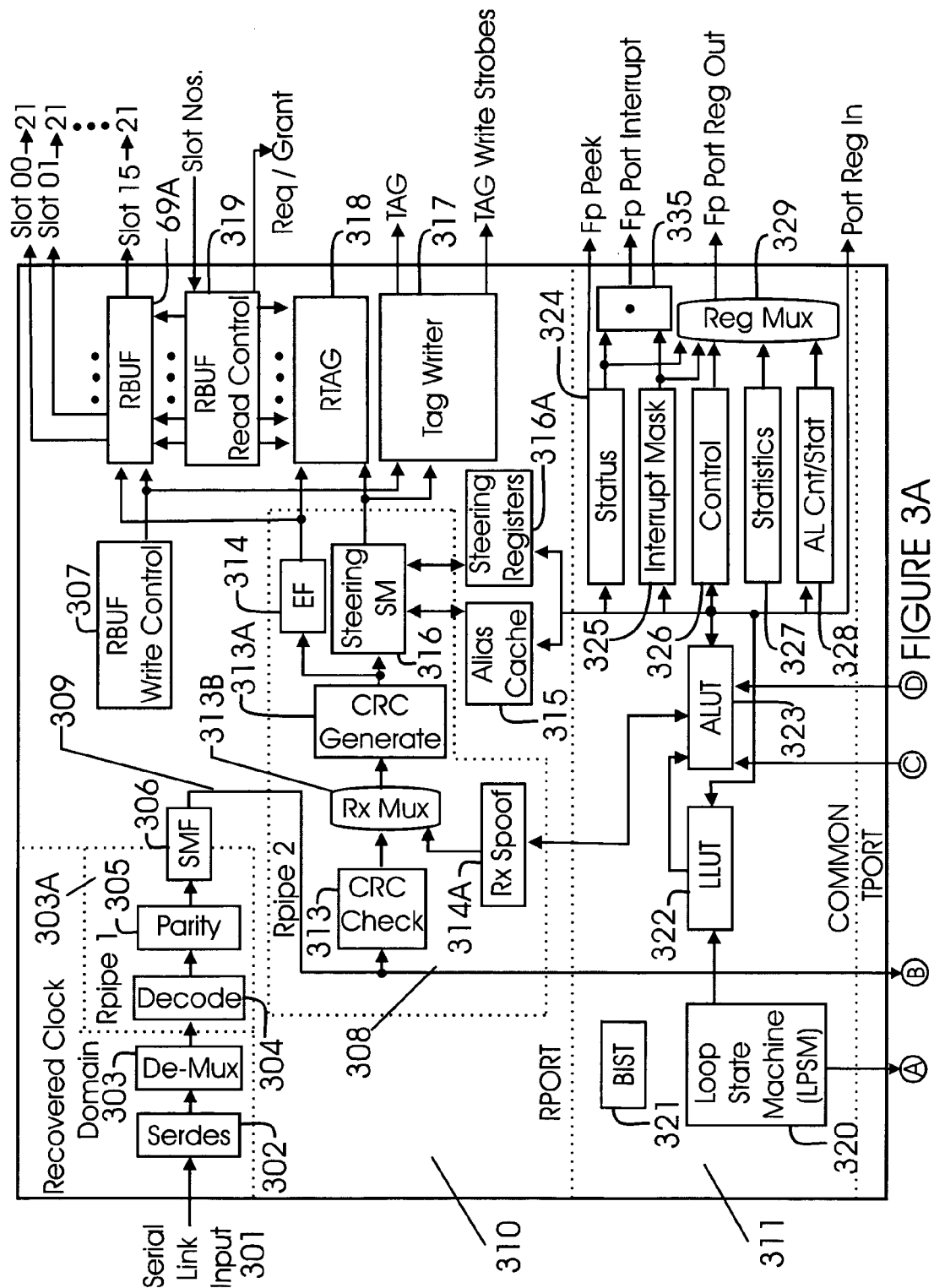
FIGS. 3A/3B (jointly referred to as FIG. 3) show a block diagram of a GL_Port, according to one aspect of the present invention.
Figure 3B:
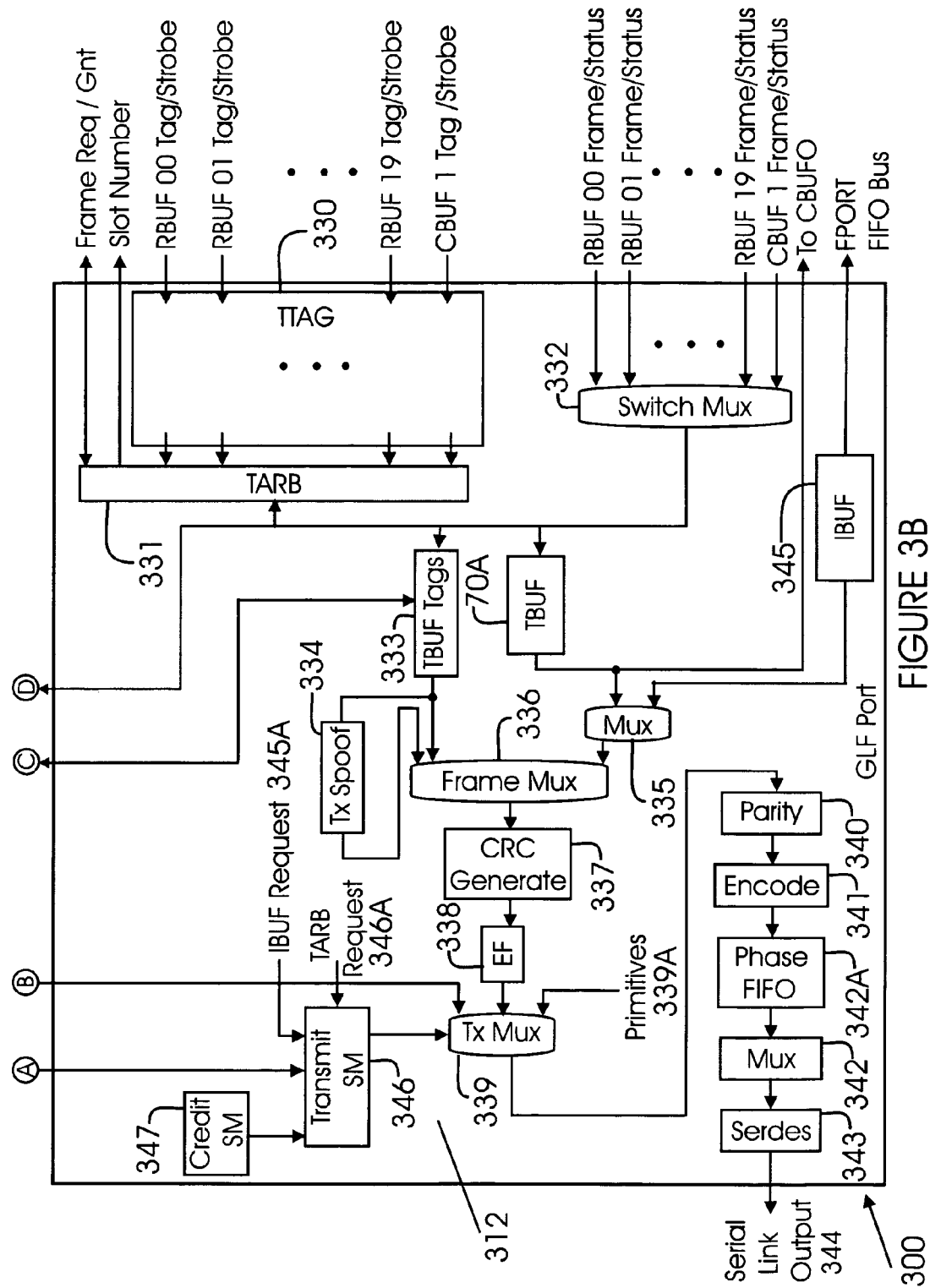

GL_Port:

FIGS. 3A-3B (referred to as FIG. 3) show a detailed block diagram of a GL port as used in ASIC 20. GL port 300 is shown in three segments, namely, receive segment (RPORT) 310, transmit segment (TPORT) 312, and common segment 311.

Receive Segment of GL_Port:

Frames enter through link 301 and SERDES 302 converts data into 10-bit parallel data to fibre channel characters, which are then sent to receive pipe ("Rpipe" may also be referred to as "Rpipe 1" or "Rpipe 2") 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. RWT 307 specifies which empty RBUF 69A slot will be written into when a frame arrives through the data link via multiplexer 313B, CRC generate module 313A and EF (external proprietary format) module 314. EF module 314 encodes proprietary (i.e. non-standard) format frames to standard Fibre Channel 8B codes. Mux 313B receives input from Rx Spoof module 314A, which encodes frames to a proprietary format (if enabled). RWT 307 controls RBUF 69A write addresses and provides the slot number to tag writer ("TWT") 317.

RRD 319 processes frame transfer requests from RBUF 69A. Frames may be read out in any order and multiple destinations may get copies of the frames.

Steering state machine (SSM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multi-cast or broadcast).

SSM 316 makes this determination using information from alias cache 315, steering registers 316A, control register 326 values and frame contents. IOP 66 writes all tables so that correct exit path is selected for the intended destination port addresses. Alias cache 315 based routing is described below in detail, according to one aspect of the present invention.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL_Port:

Transmit segment ("TPORT") 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX (also referred to as "TxMUX") 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux", may also be referred to as "Mux") 336 chooses the frame source, while logic (TX spoof 334) converts D_ID and S_ID from public to private addresses. Frame Mux 336 receives input from Tx Spoof module 334, TBUF tags 333, and Mux 335 to select a frame source for transmission.

EF (external proprietary format) module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL_Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG_Port

Figure 4A:
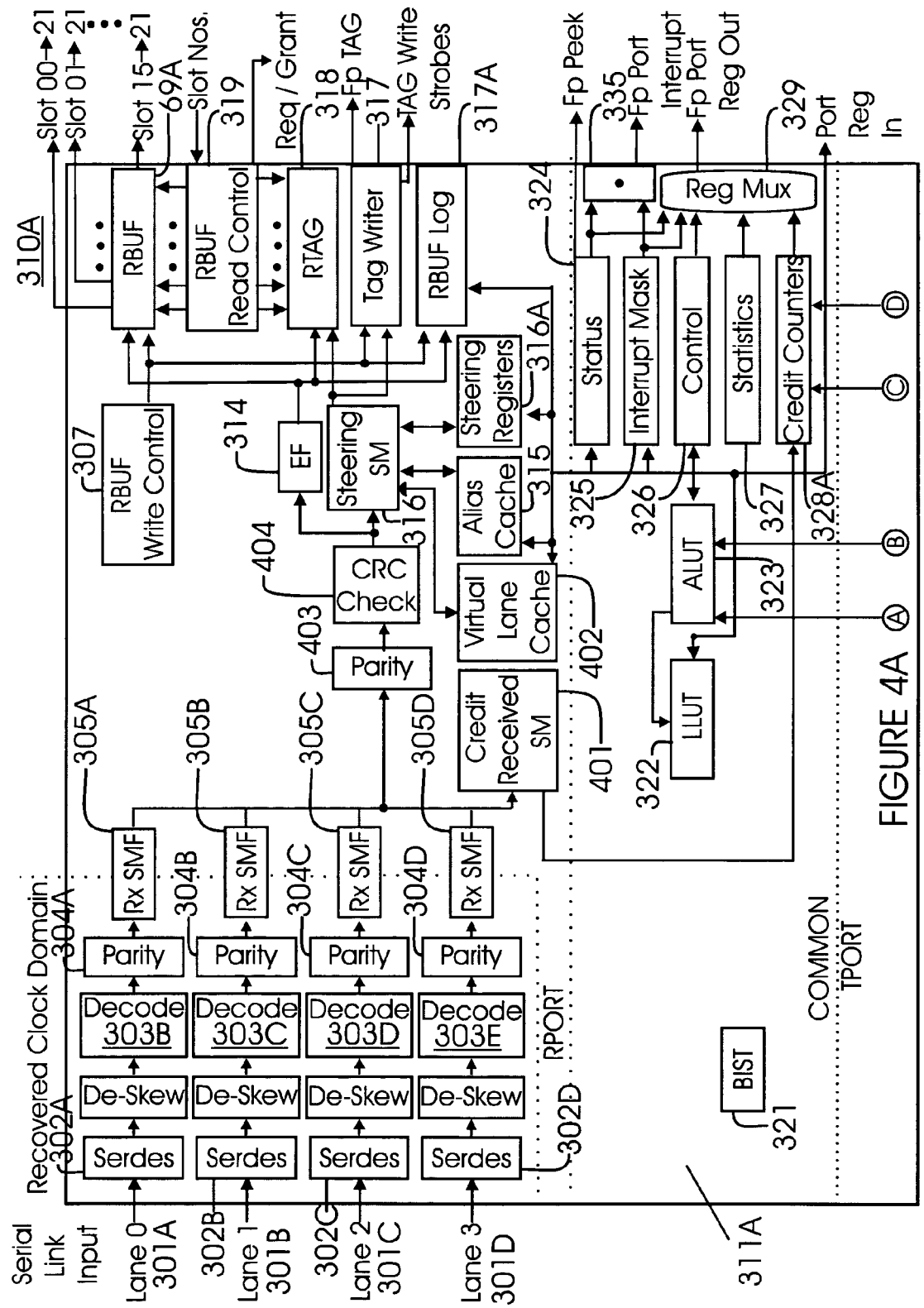
FIGS. 4A/4B (jointly referred to as FIG. 3) show a block diagram of XG_Port (10 G) port, according to one aspect of the present invention.
Figure 4B:
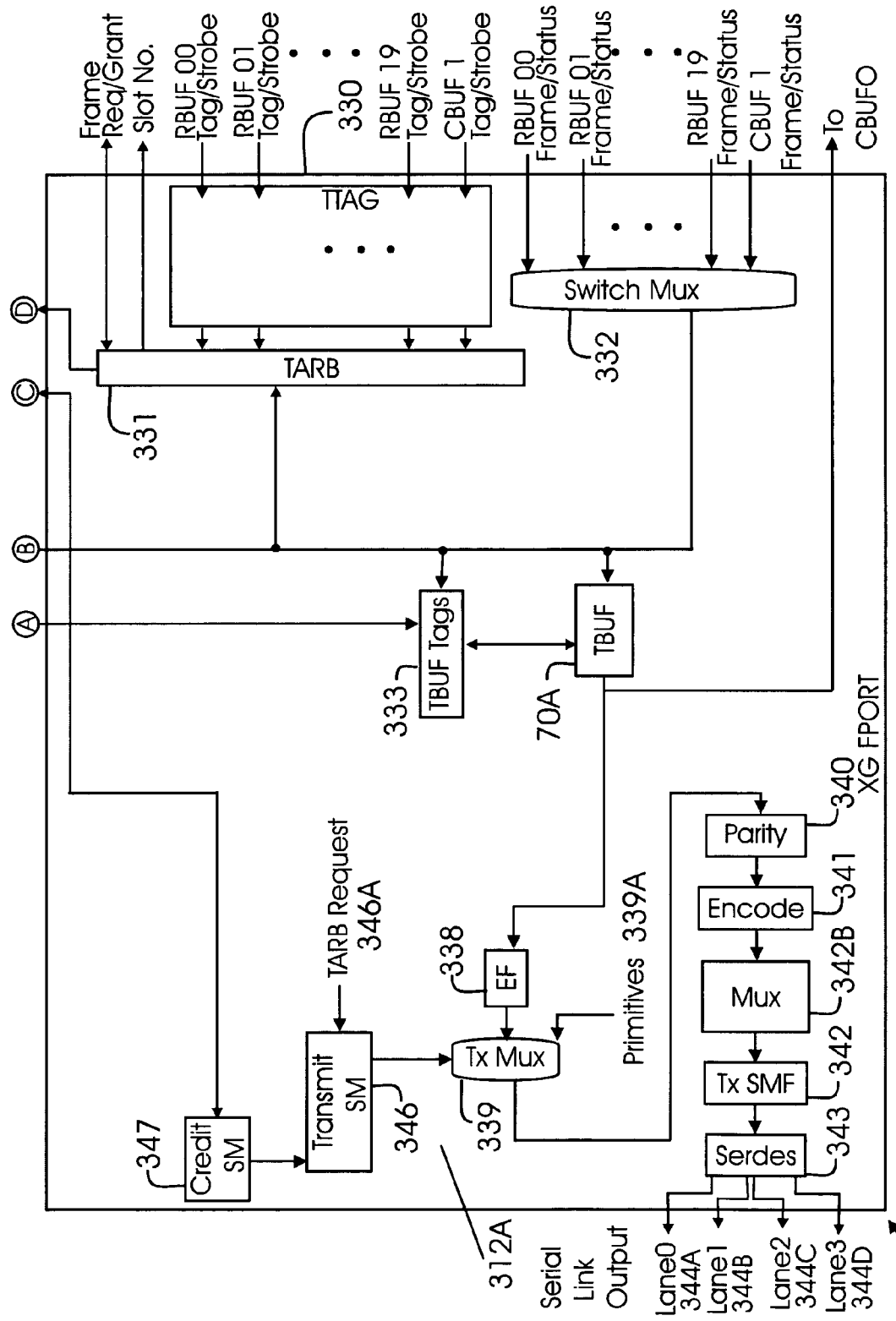

FIGS. 4A-4B (referred to as FIG. 4) show a block diagram of a 10 G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a soothing function ("TxSMF") module 342 that handles clock variation on the transmit side. SERDES 343 then sends the data out to the link.

Buffer-to-Buffer Credit Recovery:

In one aspect of the present invention, virtual lane assignment can be programmed based on firmware or fabric topology, making the system and process versatile and flexible. In yet another aspect of the present invention, virtual lane statistics are collected for each lane.

Various counters can be used in statistics module 327 to gather information. Plural bit counters (Virtual Lane Credit Count) are used to monitor virtual lane credit. The counter may be located among credit counters 328A. The counters decrement each time a select R_RDY or VC_RDY is received and increment each time a frame is transmitted on a virtual lane. The following are some of the bits that may be used to monitor credits:

"TBUF_Frame_Departure: This bit sets each time a frame departs for a given virtual lane.

"HZ_Toss_Frame_Rollover" This denotes that a hard zoning toss count counter for a given virtual lane has overflowed and has gone back to zero.

"CL3_Toss_Frames_Rollover": This denotes that CL3TC counter for a given virtual lane has overflowed.

"CL2_Frames_Out_Rollover": This denotes that the C2FO counter for a given virtual lane has overflowed.

"CL2_Words_Out_Rollover": This denotes that the C2WO counter for a given virtual lane has overflowed.

"CL3_Frames_Out_Rollover": This denotes that the C3FO counter for a given virtual lane has overflowed.

"CL3_Words_Out_Rollover": This denotes that the C3WO counter for a given virtual lane has overflowed.

"TwaitC0_Thres" Denotes that TWAITCO threshold for a given virtual lane has overflowed.

"Wait_Count0_Rollover": This denotes that the TWAITCO counter for a given virtual lane has overflowed.

"CL3_Toss_Error": This sets when a class fibre channel 3 frame is tossed out of TBUF 70A. This can occur because the frame timed out in RBUFF 69A or CBUF 62D, port is offline or logged out or TTAG 330 is in a flush state.

"CL2_Toss_Error"; This sets when a class 2 frame is tossed out of TBUF 70A.

The foregoing parameters as collected by modules 327 and 328A can be used by firmware for diagnostic purposes as well as for improving bandwidth.

Virtual Lane Credit Recovery

As discussed above, the virtual lane mechanism divides credit among the virtual lanes. The number of lanes is defined when it is set up. Each lane has an identifier (VL_ID). The primitive VC_RDY is used instead of R_RDY for flow control of each lane. Both ports on a link support this mechanism.

In one aspect of the present invention, BB_SCrs are transmitted whenever 2BB_SC_N have been transmitted since the last BB_SCr. The receiving port detects the lost VC_RDY(s) or R_RDY(s) if it receives less than 2BB_SC_N VC_RDYs or R_RDY(s) between the BB_SCrs. The lost credit is then assigned to a virtual lane that does not have its maximum credit (i.e., credit counter is not equal to 0) by a credit distribution process. However, this recovered credit may not have been assigned to the correct lane, i.e., the one with the lost VC_RDY, according to one aspect of the present invention.

The VC_RDY distribution process, according to one aspect of the present invention, corrects this because when a VC_RDY for a lane is received which already has maximum credit, the credit is then assigned to the next highest virtual lane that does not have its maximum credit. If the VC_RDY is received for the last virtual lane with the highest number, then the newly received credit (VC_RDY) is passed to the lowest number port that does not already have its maximum credit. Eventually the credit is restored to the correct lane, as described below.

If a R_RDY or VC_RDY is received when a BB_SCr is expected, the R_RDY or VC_RDY is held temporarily until a determination can be made if the BB_SCr was lost or if an extra R_RDY or VC_RDY was received. If more R_RDYs or VC_RDYs are received then it is determined that the BB_SCr was lost. The held R_RDY or VC_RDY is used to adjust the link credit. If a BB_SCr is received before a number of R_RDYs or VC_RDYs, then it is determined that an extra R_RDY or VC_RDY was received. A status bit is set to indicate if a BB_SCr was lost or if extra R_RDY(s) or VC_RDY(s) were received.

BB_SCs are transmitted whenever 2BB_SC_N frames have been transmitted since the last BB_SCs. The receiving port detects lost frame(s) if it receives less than 2BB_SC_N frames between BB_SCs. The lost credit is recovered by transmitting R_RDY(s) to the other port. The other port assigns the credit to a virtual lane that does not have maximum credit. Again, this may not be the correct lane, but when a VC_RDY for the lane is received when it has maximum credit, the credit is then assigned to another lane that does not have its maximum credit as described above. Eventually the credit is restored to the correct lane.

If a frame is received when BB_SCs are expected, then this state is held temporarily until it is determined if the BB_SCs were lost or if an extra frame was received. If more frames are received then it is determined that the BB_SCs were lost and the state is cleared. But if BB_SCs are received before a number of frames then it is determined that an extra frame was received. A status bit is set to indicate if BB_SCs were lost or if an extra frame(s) was received.

In one aspect of the present invention, credit state machine ("SM") 401 in conjunction with credit counters 328, counts the number of frames received between BB_SCs, and number of R_RDYs or VC_RDYs between BB_SCrs. If credit SM 401 detects the loss of X number of R_RDYs or VC_RDYs (for example 4), then it sets a status bit in status register 324, which notifies the firmware that more than a certain number (or threshold number) of R_RDYs or VC_RDYs have been lost.

In one aspect of the present invention, a running count of the status bit is maintained to keep track of how many times a particular event has occurred. Event specific threshold may also be used to generate status to firmware.

In one aspect of the present invention, credit SM 401 counts VC_RDYs just as R_RDY. If a VC_RDY is lost, then it is assigned based on a priority scheme.

Figure 6:
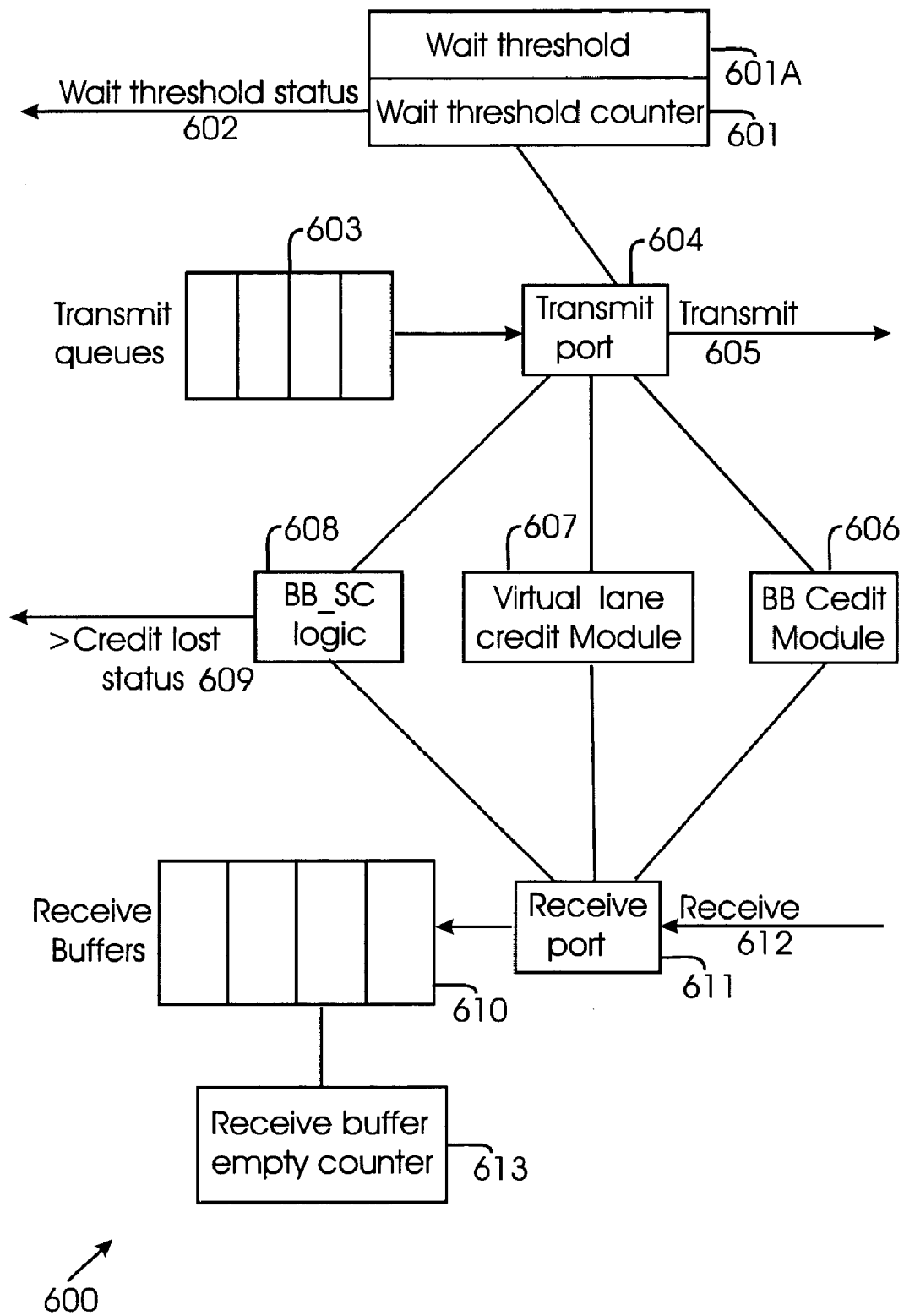
FIG. 6 shows a block diagram of a system used for buffer-to-buffer credit, according to one aspect of the present invention.

FIG. 6 shows a block diagram of system 600 used for buffer-to-buffer credit, according to one aspect of the present invention. System 600 is incorporated in the system disclosed in FIG. 4 that is described above in detail.

Wait Threshold Counter 601:

The wait threshold counter 601 is used to set a status 602 if a port has to wait (for a certain period) to send a frame because of lack of buffer-to-buffer credit. The threshold value 601A for a wait period is programmable by firmware.

The wait threshold counter 601 is incremented for every transmit word clock interval that a transmit port 604 has a frame available, but does not have buffer-to-buffer credit to send it. The wait threshold counter 601 is decremented every time a data word is transmitted. Counter 601 does not decrement below 0 or increment above a programmed threshold value 601A. When the threshold counter 601 is incremented to the programmed threshold value 601A, a status 602 is generated. This information could also be detected by firmware to implement a software version of credit recovery when both ends of the link do not support the use of BB_SC primitives.

Transmit Queues 603

The transmit queues 603 (in TBUF 70A) contain frames to be transmitted by port 604. If virtual lanes are used, there may be multiple queues to take advantage of multiple virtual lanes.

Transmit port 604 (similar to 312A) sends Fibre Channel frames and primitive signals, including R_RDY, VC_RDY, BB_SCr, and BB_SCs for buffer to buffer flow control.

BB_Credit Module 606:

BB Credit module 606 may be located in credit SM 401 and controls buffer-to-buffer credit for the transmit port 604. A BB_Credit programmable value is set at port login (per the FC-FS and FC-SW-3 standards). A BB_Credit_CNT is initialized to 0 and it is incremented whenever a frame is sent, and decremented whenever a R_RDY or VC_RDY is received. It may also be decremented when a BB_SCr is received if credit was lost. When BB_Credit_CNT is equal to the programmable maximum BB_Credit value, no frames are sent. BB_Credit_CNT could also be implemented to count down from the BB_Credit value to 0.

Virtual Lane Credit Module 607:

Every frame sent or received is assigned a virtual lane. The transmit port 604 and the receive port 611 (similar to 310A) agree on virtual lane assignment for maximum performance. If there are N virtual lanes, there are N VL_Credit registers in module 607(VL_Credit(0) to VL_Credit(N−1)) and N VL_Credit_CNT registers (VL_Credit_CNT(0) to VL_Credit_CNT(N−1)). The total buffer-to-buffer credit determined at port login is divided up between the VL_Credit registers, so that the total of the VL_Credit registers is equal to or less than the BB_Credit value from port login and the VL_Credit_CNT counters are initialized to 0.

Each virtual lane has its own separate flow control and the VC_RDY primitive signal is used for flow control. Each VC_RDY contains a coded number corresponding to the virtual lane it is being used for. Whenever a frame assigned to virtual lane n is sent, VL_Credit_CNT(n) is incremented. Whenever a VC_RDY(n) is received, VL_Credit CNT(n) is decremented. If VL_Credit_CNT(n) is equal to the maximum VL_Credit(n), no more frames assigned to virtual lane n can be sent until VL_Credit_CNT(n) is decremented.

Whenever a frame assigned to virtual lane n is received, and the buffer for that frame is emptied and becomes available again, a VC_RDY(n) is sent back to the transmitting port.

Behavior of virtual lane credit when R_RDY primitives are received, and BB_SC primitives indicate loss of credit, and when VC_RDY signals do not match the original frame virtual lane, the credit is readjusted as described below.

If all frames sent are eventually delivered by a receiver and acknowledged with R_RDY or VC_RDY, frame traffic never stalls for any virtual lane, even if some VC_RDY signals are mismatched.

BB_SC Logic 608

If any loss of transmit credit is detected (i.e. lost R_RDY(s) or VC-RDY(s)), logic 608 generates internally the equivalent number of R_RDY primitive signals that should have been received. If more than a threshold number of credit loss is detected when a BB_SC is received, a status signal 609 is generated and sent to IOP 66. This threshold value may be a fixed or programmable. The firmware running on IOP 66 may choose to reset the link if a threshold number of credits are lost within the BB_SC interval. The firmware may also look at trends regarding the credit lost to make decisions about resetting the link or providing statistical data to system users for preventive maintenance of the link or the overall system.

If any loss of receive credit is detected (i.e. lost frame), logic 608 generates the equivalent number of R_RDY primitive signals that should have been sent in the first place. These R_RDY signals are then sent to the device on the other end of the link. If more than a threshold number of R_RDY(s) are received in virtual lane mode, a status signal 609 is generated and sent to IOP 66. This threshold number may be any value, fixed or programmable. The firmware running on IOP 66 may chose to reset the link if a threshold number of R_RDY(s) were received within the BB_SC interval when running in virtual lane mode. Again the firmware may also look for a trend on the loss of frames by the receiving port for statistics and/or preventive maintenance.

Receive Buffers:

The number of receive buffers 610 (similar to 69A) available for frames is set during port login, and becomes the BB_Credit value used by the other end of the link. Whenever a receive buffer that was in use becomes available for a new frame, a R_RDY or VC_RDY primitive signal is sent.

Receive Port 611 processes incoming frames (612), and primitive signals such as R_RDY, BB_SC and VC_RDY.

Receive Buffer Empty Counter 613 maintains the count for the number of receive buffers available for received frames. If there are empty receive buffers at the same time that transmit port 604 on the other end does not have any buffer to buffer credit, this indicates that buffer to buffer credit was lost, either because of a lost R_RDY or VC_RDY primitive, or because a transmitted frame's SOFx was corrupted. This information could be detected by firmware to implement a software version of credit recovery when both ends of the link don't support the use of BB-SC primitives.

Process for VC_RDY Received:

When a VC_RDY(n) is received, VL_Credit_CNT(n) value is decremented, unless it is already 0. If VL_Credit(n) is already 0, the highest priority (i.e. the lowest number) VL_Credit_CNT value that is not already 0 is decremented. The priority for virtual lanes is the inverse of the virtual lane number; so virtual lane 0 is the highest priority.

This recovers credit even if the virtual lane indicated by the VC_RDY(s) does not match the virtual lanes assigned by transmit port 604. Since every VC_RDY is applied to a non-zero VL_Credit_CNT, if all sent frames are acknowledged by a VC_RDY, all VL_Credit_CNT values will be decremented back to 0. This is especially useful if virtual lane assignments are changed on a running port. The two ends of the link do not have to change the configurations at the exact same time, since the same process that is used for credit recovery will also recover temporarily mismatched virtual lanes.

Process for R_RDY Received:

If R_RDY flow control primitive signals are received from credit recovery, they cannot be directly matched to virtual lanes. This process uses virtual lane priorities and history variables or any other scheme to assign credit from R_RDYs to virtual lanes. Since all R_RDYs are assigned to a non-zero VL_Credit_CNT register, all credit can be recovered if all frames sent are acknowledged or accounted for by credit recovery, R_RDY or VC_RDY primitive signals.

If the pseudo virtual lane feature is used, this R_RDY credit mechanism is the primary method of flow control credit processing.

If BB_SCs primitive signals indicate loss of credit, the credit process acts as if the equivalent number of R_RDYs were received.

The following variables are used in the calculation to decrement VL_Credit_CNT when an R_RDY is received, assuming that there are N virtual lanes:

VL_Credit_CNT (0 . . . N−1):

The current number of frame transmit credits used for each virtual lane.

VL_Credit (0 . . . N−1):

The maximum frame transmit credit for each virtual lane. The sum of the VL_Credit values is equal to or less than the total number of buffer to buffer credits (BB_Credit) established at port login.

VL_Credit_Threshold (0 . . . N−1):

A threshold value used in the credit calculation. VL_Credit_Threshold(n) is less than the value in VL_Credit_(n).

Age (a, b) (a less than b):

Set to 1 if virtual lane "a" has had a longer time since its credit count was decremented than virtual lane "b", otherwise set to 0. Initialized to 0. After a VL_Credit_Cnt(n) value is decremented, the following determines the setting for Age(a, b):

Age (a,b) set to 1 if (n=b) or ((Age (a,b)=1) and (n< >a))

Otherwise Age(a,b) is set to 0 mincnt

A 5-bit counter is used to prevent starvation of lower priority virtual lanes, which is incremented each time an R_RDY is received, and rolls over to 0 if previous value was hex 1F.

Virtual Lane R_RDY Process:
cntzero(n)
True if VL_Credit_CNT(n)=0.
thres(n)
True if VL_Credit_CNT(n)<
VL_Credit_Threshold(n)
amz
True if for all virtual lanes
(VL_Credit_CNT(n)=0) or (VL_Credit_CNT(n)=VL_Credit(n))
or if mincnt=hex 1F Virtual Lane Decrement Calculation:

The VL_Credit_CNT(n) value for virtual lane n is decremented if the following expression is true. Expression uses '&' for logical AND, '|' for logical OR, and '!' for logical NOT. The expression is true for 1 virtual lane, or none if all credit counts are already at zero.

```
!cntzero(n) &
((thres(0) & thres(1) & ... thres(n-1)) | amz)
&
((cntzero(0) | !age(0,n)) & (cntzero(1) |
!age(1,n)) &... (cntzero(n-1) & !age(n-1,n)))&
(( !thres(n) & !amz) | cntzero(n+1) | age(n,n+1)
)&
((( !thres(n) | !thres(n+1)) & !amz) |
cntzero(n+2) | age(n, n+2) ) &
.
.
.
((( !thres(n) | !thres(n+1) | ... !thres(N-2)) &
!amz) | cntzero(N-1) | age(n, N-1) )
```

The same distribution process (or algorithm) is used for R_RDY(s) received or generated because of loss of credit when in virtual lane mode. The threshold values would most likely be set to zero forcing the use of age to distribute the recovered credit. This is done so that a particular virtual lane does not have priority over other virtual lanes as averaged over time.

Figures 1, 7:
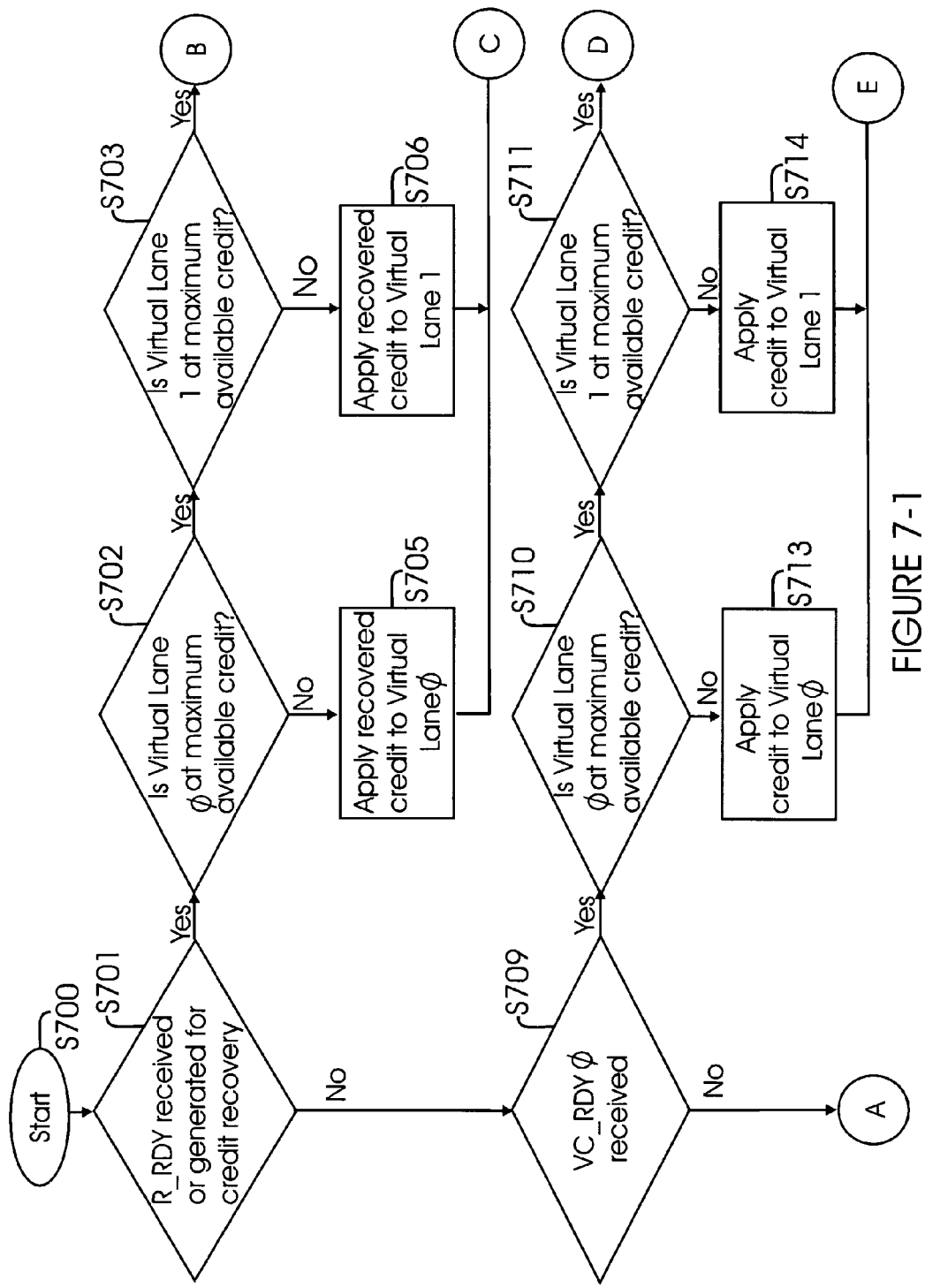
FIGS. 7-1/7-4 (referred to as FIG. 7) show a flow diagram of executable process steps for distributing VC_RDYs in one aspect of the present invention in virtual lane mode.
Figures 2, 7:
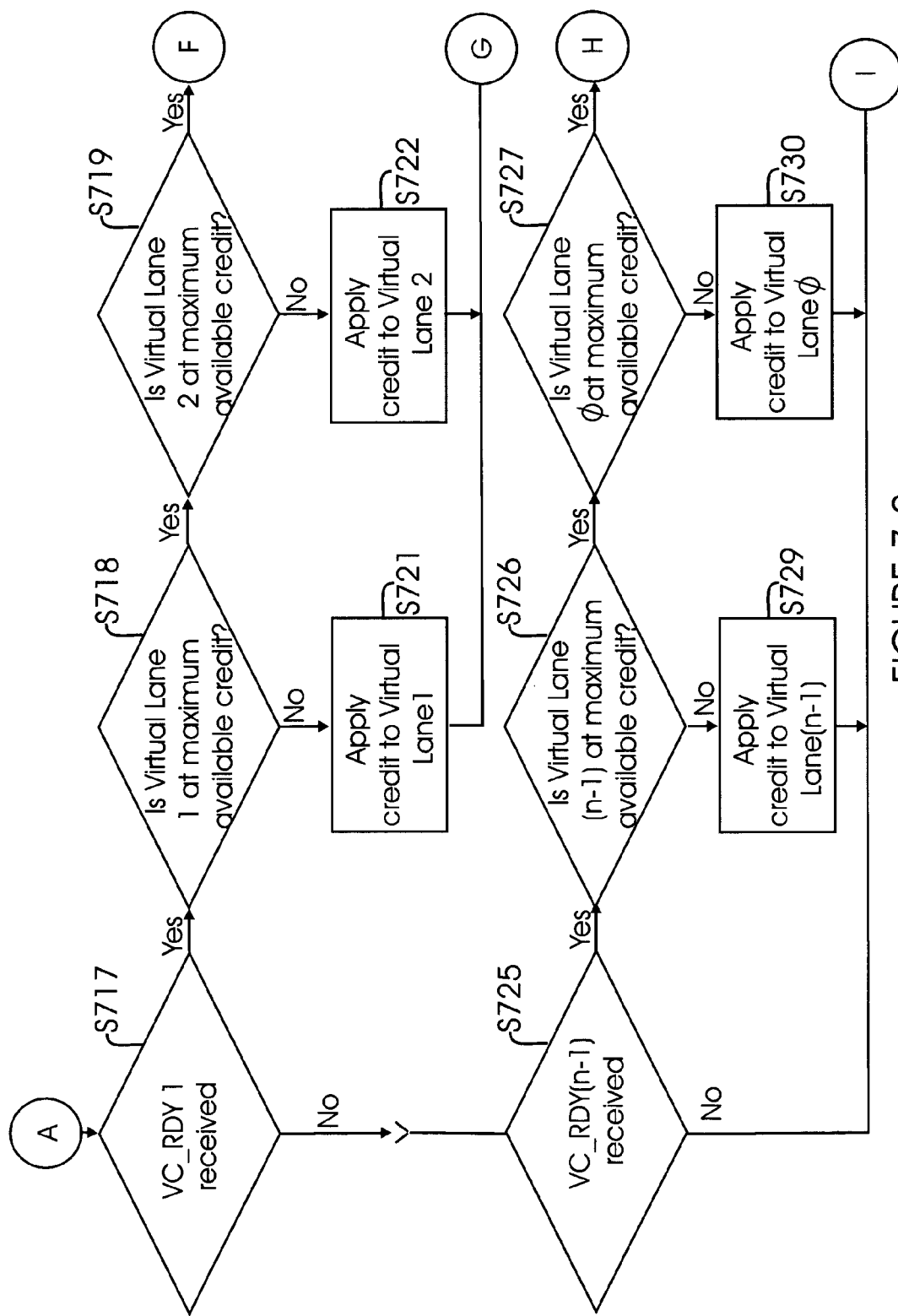
Figures 3, 7:
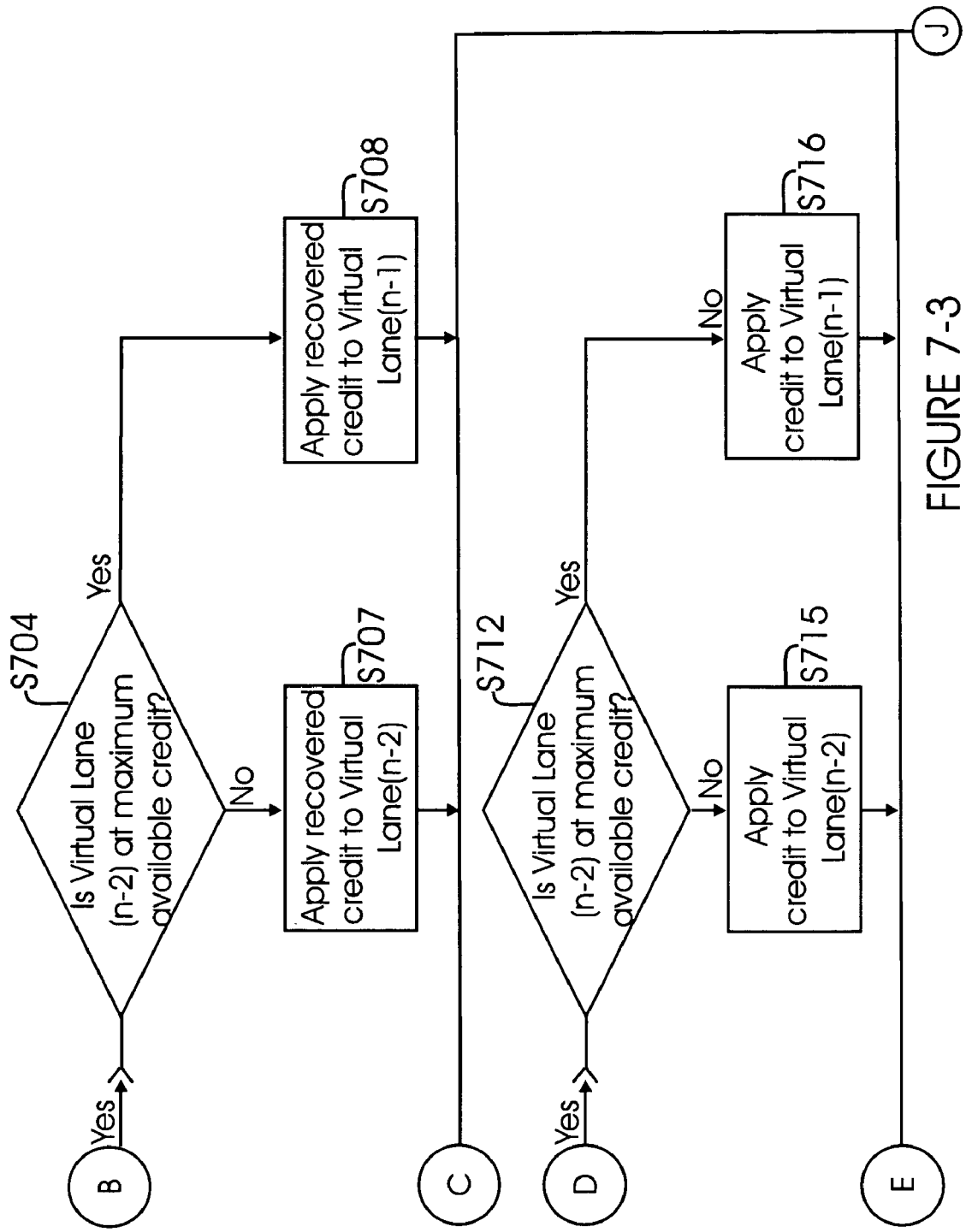

Credit Distribution:

FIG. 7 shows a flow chart of executable process steps for distributing VC_RDYs in one aspect of the present invention in virtual lane mode.

The process starts in step S700, and in step S701, the process determines if an R_RDY has been received or internally generated for credit recovery.

If an R_RDY has been received or generated, then in step S702, the process determines, if the first virtual lane is at its maximum credit. If it is not, then in step S705, the recovered credit is applied to first virtual lane (or virtual lane 0).

If virtual lane 0 is at its maximum credit, then in step S703, the process determines if the virtual lane 1 (i.e., the second virtual lane) is at its maximum available credit. If no, then in step S706, the recovered credit is applied to virtual lane 1, otherwise the process continues as shown in steps S704, S707 and S708, until all the N lanes have been analyzed.

If an R_RDY is not received or generated for recovery in step S701, then in step S709, the process determines if a VC_RDY (for example VC_RDY 0) has been received. If VC_RDY 0 is received, then the process determines in step S710, if virtual lane 0 is at its maximum available credit (similar to step S702). If it is not at its maximum available credit, then in step S713, the credit is applied to virtual lane 0. If it is at its maximum credit, then the same analysis is performed for virtual lane 1 through virtual lane n-1, in steps S711-S716, as shown in FIG. 7.

Steps S717-S732 illustrates process steps that are similar to step S709-S716 that are discussed above.

Pseudo Virtual Lane Credit Recovery:

When one port on a link does not support the virtual lane mechanism, a pseudo virtual lane ("PVL") mechanism can be used by one of the ports. The present invention allows the firmware to program a port for a PVL mode. The PVLs are used to allocate receive buffer credits on the other end of an E_Port or N_Port. The credits are allocated in groups so that a device sending frames to a slow device does not consume all of the available receive credits and cause bandwidth degradation.

The number of pseudo virtual lanes is defined when it is set up. R_RDY is used for flow control of each lane with the mechanism assigning the credit to the lanes according to a priority algorithm.

The port with the pseudo virtual lane mechanism transmits BB_SCr and BB_SCs according to the Fibre Channel credit recovery requirements. When it receives BB_SCr and detects lost R_RDY(s), the lost credit is assigned to the pseudo lane according to a priority algorithm. Lost frames are handled the same way as Fibre Channel defines by transmitting an R_RDY to the other port for each frame lost.

Pseudo virtual lanes assign virtual lanes to frames and use separate credit for flow control on each virtual lane, but does not send or receive VC_RDY primitives, instead use the standard R_RDY flow control primitive signal. This has the advantage that the receive end does not have to implement virtual lanes, and thus can be used when connected to a port that does not have the virtual lane feature. R_RDY processing for pseudo virtual lanes uses the same process as described above.

Although the present invention has been described with reference to specific embodiments, these embodiments are illustrative only and not limiting. Many other applications and embodiments of the present invention will be apparent in light of this disclosure and the following claims.

What is claimed is:

1. A method for distributing credit in a fibre channel switch element, comprising:

(a) determining if (i) a port for the fibre channel switch element using a plurality of virtual lanes has received a flow control link primitive, R_RDY instead of a VC_RDY, a flow control link primitive used for credit in virtual lanes; and (ii) if the fibre channel switch element has internally generated the primitive, R_RDY for recovering lost credit due to loss of data frames;

wherein each virtual lane is identified by an identification number;

(b) determining if a first virtual lane from among the plurality of virtual lanes has reached a maximum credit value allocated for the first virtual lane;

(c) if the first virtual lane has reached the maximum credit value, iteratively determining if another virtual lane for the port has not reached a maximum allocated credit value; and allocating the recovered lost credit to a virtual lane from among the plurality of virtual lanes that has not reached the maximum allocated credit value;

(d) if an R_RDY primitive is not received or generated for credit recovery in step (a); determining if the primitive, VC_RDY indicating that credit is available at a virtual lane at a destination port has been received by the port;

(e) determining if the virtual lane identified by the VC_RDY received in step (d) has already reached its maximum allocated credit; and (f) iteratively analyzing each of the remaining plurality of virtual lanes and applying the credit based on the received VC_RDY in step (d) to a virtual lane that has not reached a maximum allocated credit even if a VC_RDY virtual lane identification number indicates that credit be allocated to a different virtual lane.

2. The method of claim 1, wherein a processor for the fibre channel switch element resets a link if one or more of credit loss and frame loss exceeds a threshold value.

3. A method for distributing credit in a fibre channel system having a fibre channel switch element, comprising:

(a) detecting lost credit at a port for the fibre channel switch element if fewer than expected VC_RDYs and R_RDYs are received between BB_SCrs;

wherein VC_RDY is a link primitive indicating credit for a virtual lane of a port supporting a plurality of virtual lanes;

wherein R_RDY is a link primitive indicating credit at a receive segment of a port, wherein BB_SCr is a link primitive used for tracking lost credit in the fibre channel system; and wherein each of the plurality of virtual lanes supported by the port in step (a) is assigned an identification number and is allocated a maximum credit value;

(b) iteratively determining if a virtual lane from among the plurality of virtual lanes for the port has not reached its maximum allocated credit value; and (c) allocating the recovered lost credit from step (a) to the virtual lane from among the plurality of virtual lanes, that has not reached the maximum allocated credit value; wherein the recovered lost credit is allocated to a virtual lane that is different from the virtual lane identified by the VC_RDY, if the identified virtual lane has reached the maximum allocated credit value.

4. The method of claim 3, further comprising:

determining if a BB_SCr, a link primitive, is lost or extra credit is received if a R_RDY or VC_RDY is received when a BB_SCr is expected; and setting a status bit to indicate if a BB_SCr was lost or an extra R_RDY or VC_RDY is received.

5. A fibre channel switch element for routing fibre channel frames, comprising:

a plurality of ports for receiving and transmitting frames, each port including a transmit segment and a receive segment;

a wait threshold counter that monitors a duration a transmit segment of a port has to wait for sending a frame due to lack of buffer to buffer credit and if the duration exceeds a programmable threshold value, the wait threshold counter generates a status signal;

a credit module that controls buffer to buffer credit for a transmit segment of a port; and a virtual lane credit module with a counter that is incremented every time a frame assigned to a virtual lane is sent and decreased every time a VC_RDY, a link primitive indicating that credit is available at a virtual lane at a destination port has been received by the port is received;

wherein for allocating recovered lost credit among a plurality of virtual lanes, based on a received R_RDY, a VC_RDY and a R_RDY generated by the switch element for lost data frames, the fibre channel switch element (a) determines if a first virtual lane from among the plurality of virtual lanes supported by a port at the fibre channel switch element has reached a maximum credit value allocated for the first virtual lane; (b) iteratively determines if another virtual lane for the port has not reached a maximum allocated credit value; and (c) allocates the recovered lost credit to a virtual lane from among the plurality of virtual lanes, that has not reached the maximum allocated credit value; and wherein the virtual lane to which credit is allocated is different from the virtual lane identified by the VC_RDY used for the lost credit, if the identified virtual lane has reached its maximum allocated value.

6. The fibre channel switch element of claim 5 further comprising:

a logic module that generates a status signal if loss of more than a threshold number of frame credit due to loss of R_RDY and VC_RDY is detected, wherein R_RDY is a link primitive indicating available credit at a receive segment of a port.

7. The fibre channel switch element of claim 6, wherein the threshold number is programmable or fixed.

8. The fibre channel switch element of claim of 6, wherein if lost frames are detected, then the logic module generates an equivalent number of R_RDY link primitives that should have been received and sends the generated R_RDY link primitives to a device on another end of a link.

9. The fibre channel switch element of claim 6, wherein the fibre channel switch element firmware resets a link if loss of more than a threshold number of frame credit is detected.

10. The fibre channel switch element of claim 6, wherein the fibre channel switch element firmware resets a link if loss of more than a threshold number of R_RDY primitive or VC_RDY primitive is detected.

11. The fibre channel switch element of claim 6, wherein the fibre channel switch element firmware provides statistics when a loss of more than a threshold number of frame or credit is detected; and the statistics are used for trend analysis on a link.

12. The fibre channel switch element of claim 6, wherein the fibre channel switch element firmware provides statistics if loss of more than a threshold number of R_RDY primitive or VC_RDY primitive is detected; and the statistics are used for trend analysis on a link.

* * * * *

UNITED STATES PATENT AND TRADEMARK OFFICE
CERTIFICATE OF CORRECTION

PATENT NO. : 7,630,384 B2
APPLICATION NO. : 10/894586
DATED : December 8, 2009
INVENTOR(S) : Dropps et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 928 days.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,630,384 B2
APPLICATION NO. : 10/894586
DATED : December 8, 2009
INVENTOR(S) : Frank R Dropps et al.

Page 1 of 1

It is certified that error appears in the above-identified patent and that said Letters Patent is hereby corrected as shown below:

On the Title page, in field (57), in column 2, in "Abstract", line 1, delete "fiber" and insert -- fibre --, therefor.

On the Title page, in field (57), in column 2, in "Abstract", line 7, delete "fiber" and insert -- fibre --, therefor.

Title page 4, in column 2, under "Other Publications", line 32, delete "Univerisity" and insert -- University --, therefor.

In column 17, line 5, in claim 1, delete "VC_RDY" and insert -- VC_RDY, --, therefor.

Signed and Sealed this

Ninth Day of November, 2010

David J. Kappos
*Director of the United States Patent and Trademark Office*